US012334789B2

(12) United States Patent
Dotz

(10) Patent No.: US 12,334,789 B2
(45) Date of Patent: Jun. 17, 2025

(54) STATOR FOR AN ELECTRIC MACHINE, AND ELECTRIC MACHINE

(71) Applicant: Valeo eAutomotive Germany GmbH, Erlangen (DE)

(72) Inventor: Boris Dotz, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 149 days.

(21) Appl. No.: 18/257,472

(22) PCT Filed: Dec. 17, 2021

(86) PCT No.: PCT/EP2021/086637
§ 371 (c)(1),
(2) Date: Jun. 14, 2023

(87) PCT Pub. No.: WO2022/129601
PCT Pub. Date: Jun. 23, 2022

(65) Prior Publication Data
US 2024/0030769 A1    Jan. 25, 2024

(30) Foreign Application Priority Data
Dec. 17, 2020  (DE) ............... 10 2020 216 149.6

(51) Int. Cl.
*H02K 3/28* (2006.01)
*H02K 1/16* (2006.01)
*H02K 3/12* (2006.01)

(52) U.S. Cl.
CPC ............. *H02K 3/28* (2013.01); *H02K 1/165* (2013.01); *H02K 3/12* (2013.01); *H02K 2213/03* (2013.01)

(58) Field of Classification Search
CPC .................................. H02K 3/12; H02K 3/28
See application file for complete search history.

(56) References Cited

U.S. PATENT DOCUMENTS 9,755,469 B2 * 9/2017 Koshino ................. H02K 3/12
10,615,655 B2 * 4/2020 Neet ..................... H02K 1/165
(Continued)

FOREIGN PATENT DOCUMENTS

DE    10 2012 108 943 A1    3/2013
WO    WO 2020/047568 A1    3/2020

OTHER PUBLICATIONS

International Search Report issued Apr. 13, 2022 in PCT/EP2021/086637 filed on Dec. 17, 2021, 2 pages.

*Primary Examiner* — Alexander Talpalatski
(74) *Attorney, Agent, or Firm* — Oblon, McClelland, Maier & Neustadt, L.L.P.

(57) ABSTRACT

Stator, which has N≥3 phases, P≥2 pole pairs and a hole count q=2 and also includes a stator core with a plurality of slots and a plurality of shaped conductors. The shaped conductors form for each phase a first and a second path and are arranged in 2·P winding zones which are each subdivided into a first and a second sub-winding zone. The shaped conductors of a respective path are interconnected to form a series connection with a first end-shaped conductor and a second end-shaped conductor by connectors, which connect shaped conductors in adjacent winding zones of the same phase in an alternating manner at two axial face sides. The shaped conductors of a respective path form a first to third section of shaped conductors successively in the series connection. The first and third sections include the first and second end-shaped conductor respectively.

20 Claims, 11 Drawing Sheets

(56) References Cited

U.S. PATENT DOCUMENTS

| | | | | |
|---|---|---|---|---|
| 10,749,399 B2* | 8/2020 | Riedl | ........................ | H02K 1/16 |
| 10,868,448 B2* | 12/2020 | Saito | ........................ | H02K 3/04 |
| 2013/0076188 A1 | 3/2013 | Ikeda et al. | | |
| 2021/0296956 A1 | 9/2021 | Eilenberger | | |

\* cited by examiner

Fig. 3

STATOR FOR AN ELECTRIC MACHINE, AND ELECTRIC MACHINE

The present invention relates to a stator for an electric machine. In addition, the invention relates to an electric machine for driving a vehicle.

Stators with a stator winding formed from shaped conductors are extremely popular particularly in automotive applications since they are particularly suitable for automated manufacture with a high degree of process reliability and simple connection options for the phases. Stators with two paths interconnected or interconnectable in parallel for each phase are known.

For example, DE 10 2012 108 943 A1 discloses a stator of an electric machine, which stator contains a stator core and a stator winding. The stator core has a number of slots, which are arranged in a circumferential direction of the stator. The stator winding consists of a number of phase windings, each of which is wound onto the stator core such that said phase winding is inserted into the corresponding slots of the stator core. The stator core has, for each of the phase windings of the stator winding, n circumferentially successive single-phase slots in which only the phase winding is accommodated, where n is a natural number greater than or equal to 2. Each of the phase windings of the stator winding has k sections which contain a first section and a k-th section, where k is a natural number greater than or equal to 2. The first to k-th sections are arranged in order from one end to the other end of the phase winding. Each of the phase windings of the stator winding consists of j sub-windings which are connected in parallel with one another between opposite ends of the phase winding, where j is a natural number greater than or equal to 2 and each of the sub-windings contains k sections. Each of the phase windings of the stator winding consists of a plurality of electrical conductor segments which are inserted into the single-phase slots for the phase winding and are connected electrically in series with one another, wherein each corresponding pair of sections, located in the slot, of the electrical conductor segments are connected on an axial side of the stator core and each corresponding pair of end parts of the electrical conductor segments are connected to one another on the other axial side of the stator core.

The invention is therefore based on the object of specifying a stator for an electric machine which is improved in comparison to the stator described above.

According to the invention, this object is achieved by a stator for an electric machine, wherein the stator has a number $N \geq 3$ of phases, a number $P \geq 2$ of pole pairs and a hole count $q=2$, wherein the stator comprises a stator core, which has a first face side, a second face side situated opposite the first face side and a plurality of slots which extend from the first face side to the second face side and are subdivided into first to L-th layers, where $L \geq 4$, and a plurality of shaped conductors which are arranged in the slots in a radially layered manner in the first to L-th layer, wherein the layers are designated in their order in the radial direction, wherein the shaped conductors form for each phase a first path and a second path, which paths are interconnectable or interconnected with one another in series or in parallel, and are arranged in $2 \cdot P$ winding zones, wherein each winding zone is subdivided into a first and a second sub-winding zone, each sub-winding zone extends over the L layers and the sub-winding zones of a respective winding zone are designated in their order along a first circumferential direction and a second circumferential direction opposite to the first circumferential direction, wherein the shaped conductors of a respective path are interconnected by connectors, which connect shaped conductors in adjacent winding zones of the same phase in an alternating manner at the first face side and the second face side of the stator core, to form a series connection with a first end shaped conductor, which is one of the first outer shaped conductors, in terms of the series connection, of the path and with a second end shaped conductor, which is the other of the outer shaped conductors, in terms of the series connection, of the path, wherein the shaped conductors of a respective path form a first section, a second section and a third section of shaped conductors successive in terms of the series connection, wherein the first section comprises the first end shaped conductor and the third section comprises the second end shaped conductor, wherein the shaped conductors of the first section and the third section are arranged in one of the sub-winding zones and at least outer shaped conductors, in terms of the series connection, of the second section, in particular all the shaped conductors of the second section, are arranged in the other of the sub-winding zones.

Therefore, a stator for an electric machine is proposed. The stator has a number $N \geq 3$ of phases, a number $P \geq 2$ of pole pairs and a hole count $q=2$. The stator comprises a stator core. The stator core has a first face side, a second face side and a plurality of slots. The second face side is situated opposite the first face side. The slots extend from the first face side to the second face side. The slots are subdivided into first to L-th layers, where $L \geq 4$. The stator further comprises a plurality of shaped conductors. The shaped conductors are arranged in the slots in a radially layered manner in the first to L-th layer. The layers are designated in their order in the radial direction. The shaped conductors form for each phase a first path and a second path. The paths are interconnectable or interconnected with one another in series or in parallel. The paths are arranged in $2 \cdot P$ winding zones. Each winding zone is subdivided into a first and a second sub-winding zone. Each sub-winding zone extends over the L layers. The sub-winding zones of a respective winding zone are designated in their order along a first circumferential direction and a second circumferential direction. The second circumferential direction is opposite to the first circumferential direction. The shaped conductors of a respective path are interconnected to form a series connection with a first end shaped conductor and with a second end shaped conductor. The first shaped conductor is one of the outer shaped conductors, in terms of the series connection, of the path. The second end shaped conductor is the other of the outer shaped conductors, in terms of the series connection, of the path. The connectors connect shaped conductors in adjacent winding zones of the same phase in an alternating manner at the first face side and the second face side of the stator core. The shaped conductors of a respective path form a first section, a second section and a third section of shaped conductors successive in terms of the series connection. The first section comprises the first end shaped conductor. The third section comprises the second end shaped conductor. The shaped conductors of the first section and the third section are arranged in one of the sub-winding zones. At least outer shaped conductors, in terms of the series connection, of the second section are arranged in the other of the sub-winding zones. All the shaped conductors of the second section can be arranged in the other of the sub-winding zones.

The stator according to the invention is distinguished, in particular, in that the first and the third section, that is to say the outer sections, of the paths of a respective phase are arranged in the same sub-winding zone, that is to say either in the first sub-winding zone or in the second sub-winding zone, of a respective winding zone and at least the outer shaped conductors of the second section are arranged in the other of the sub-winding zones of a respective winding zone. In other words, the shaped conductors of the first section and the third section of a respective path are arranged either in the first sub-winding zone of a respective winding zone if at least the outer shaped conductors of the second section of the respective path are arranged in the second winding zone, or are arranged in the second sub-winding zone of a respective winding zone if at least the outer shaped conductors of the second section of the respective path are arranged in the first winding zone. In particular, a respective connector which connects the first section to the second section of a respective path and a respective connector which connects the second section to the third section of a respective path implement a change in sub-winding zone.

The stator according to the invention therefore advantageously implements a symmetrical stator winding, the paths of which can be connected in a particularly simple manner owing to the arrangement of the end shaped conductors.

The hole count q is the number of slots per pole and phase of the stator. In the stator according to the invention, N can be ≤12, preferably N can be ≤9, particularly preferably N can be ≤6. It can be provided that P is ≤20, preferably P is ≤16, particularly preferably P is ≤12. The number of slots is preferably less than 200, particularly preferably less than 120. The number of slots can be precisely 2·P·N·q. Precisely 2·P·N·q·L shaped conductors can be provided. Each winding zone preferably implements one pole of the stator.

Precisely one winding zone of the other phases is expediently located between each pair of the adjacent winding zones of a phase in each case. In other words, each pair of adjacent winding zones of a phase is spaced apart by q·(N−1) slots. The stator is preferably designed in such a way that current flows through the winding zones of a respective phase in a direction of flow which is opposite to the direction of flow of a directly adjacent winding zone of the same phase.

In a preferred embodiment, precisely four shaped conductors can be received in each slot and/or N can be precisely 3 and/or P can be precisely 4, 6 or 8 and/or q can be precisely 2. The first layer is preferably the radially outermost layer and/or the sixth layer is preferably the radially innermost layer. However, it is also conceivable for the first layer to be the radially innermost layer and/or the sixth layer to be the radially outermost layer.

The shaped conductors can be rod-like conductors, in particular composed of copper. The shaped conductors are typically not limp. Four shaped conductors in the four layers and/or in the entire slot preferably take up at least 60%, preferably at least 80%, of the cross-sectional area of a slot. The shaped conductors preferably have a, possibly also rounded, rectangular cross section. Each shaped conductor can extend through one of the slots completely in the axial direction.

A "path" is intended to be understood as a series connection of shaped conductors realized by the connectors, which series connection can also be referred to as a "current path". Each path preferably comprises precisely P·q·L shaped conductors.

The stator core can be formed by a plurality of permanently connected individual laminations layered with each other. In particular, the stator core forms a laminated core. The slots are designed, in particular, as recesses in the stator core, which extend in the axial direction. Each slot preferably extends parallel to a centre axis along which a receiving space, surrounded by the stator core, for a rotor extends. Furthermore, a slot opening, which connects the slot to the receiving space, can be formed for each slot in the stator core.

The first circumferential direction and the second circumferential direction can also be regarded as opposite orientations or directions of rotation to a direction perpendicular to the axial direction and radial direction in cylinder coordinates. The first circumferential direction preferably corresponds to the clockwise direction, as seen from the first face side. As an alternative, the first circumferential direction can also correspond to the anticlockwise direction.

The sections are preferably each defined continuously and without overlapping with each other. The first and second end shaped conductors of a respective path form the ends of the series connection of the path. In particular, outer shaped conductors of a respective section form the ends of the series connection of the section. In so far as sections and/or groups and/or shaped conductors are designated in order in terms of the series connection, they can be counted from the first end shaped conductor to the second end shaped conductor.

In a preferred embodiment, the first section and the third section of a respective path can each extend over a smaller number of successive winding zones of the same phase as the second section of the path. In this case, the number of successive winding zones of the same phase can be ascertained by counting off the winding zones which are occupied by the shaped conductors of the section from one of the outer shaped conductors, in terms of the series connection, of the section up to the other outer shaped conductors, in terms of the series connection, of the section. Therefore, if a plurality of shaped conductors of the section are located in a winding zone, this winding zone is counted only once. The second section can form, for example, a complete turnaround or several complete turnarounds around the stator core in the first or second circumferential direction, while the first and the third section are each of shorter design, and in particular do not completely encircle the stator core.

According to a preferred embodiment, the first section of the first path can extend over a number P of successive winding zones of the same phase and/or for the second section of the first path to extend over a number 2·P or 2·P+2 of successive winding zones of the same phase and/or for the third section of the first path to extend over a number P of successive winding zones of the same phase. As an alternative or in addition, the first section of the second path can extend over a number P+2 of successive winding zones of the same phase and/or the second section of the second path can extend over a number 2·P of successive winding zones of the same phase and/or the third section of the second path can extend over a number P of successive winding zones of the same phase. The first section and the third section can then each substantially implement a half-turnaround around the stator core. The second section can then substantially implement a complete turnaround around the stator core. In this case, the sections can also overlap in one or more of the winding zones.

In an advantageous embodiment of the stator according to the invention, a respective path forms a combined lap and wave winding.

In the case of the stator according to the invention, it is preferred if some of the shaped conductors form groups of a first type of four shaped conductors, successive in terms of the series connection, which are designated in their order in terms of the series connection, wherein a first shaped conductor of a respective one of the groups of the first type is arranged in the first layer of one of the winding zones, a second shaped conductor of a respective one of the groups of the first type is arranged in the second layer of a winding zone adjacent, along the first circumferential direction, to the winding zone in which the first shaped conductor is arranged, a third shaped conductor of a respective one of the groups of the first type is arranged in the fourth layer of the winding zone in which the first shaped conductor is arranged, and a fourth shaped conductor of a respective one of the groups of the first type is arranged in the third layer of the winding zone in which the second shaped conductor is arranged. A respective group of the first type can therefore form, in particular, a lap component of the combined lap and wave winding.

In an advantageous embodiment, the first section of the first path and/or the third section of the first path can each be formed from a plurality of, in particular from P/2, groups of the first type connected in series.

In order to connect the groups of the first type in series, it is further preferred for the first shaped conductor of such groups of the first type which directly follow a fourth shaped conductor of another of the groups of the first type in terms of the series connection to be arranged in a winding zone which follows, along the first circumferential direction, that winding zone in which the fourth shaped conductor is arranged. Therefore, in particular, a wave component, advancing along the first circumferential direction, of the combined lap and wave winding can be formed.

Furthermore at the stator according to the invention, some of the shaped conductors can form groups of a second type of four shaped conductors, successive in terms of the series connection, which are designated in their order in terms of the series connection, wherein a first shaped conductor of a respective one of the groups of the second type is arranged in the second layer of one of the winding zones, a second shaped conductor of a respective one of the groups of the second type is arranged in the first layer of a winding zone adjacent, along the second circumferential direction, to the winding zone in which the first shaped conductor is arranged, a third shaped conductor of a respective one of the groups of the second type is arranged in the third layer of a winding zone adjacent, along the second circumferential direction, to the winding zone in which the second shaped conductor is arranged, and a fourth shaped conductor of a respective one of the groups of the second type is arranged in the fourth layer of a winding zone adjacent, along the second circumferential direction, to the winding zone in which the third shaped conductor is arranged. The groups of the second type therefore form, in particular in part, a wave component, advancing along the second circumferential direction, of the combined lap and wave winding.

Additionally it can be provided that the first shaped conductor of such groups of the second type which directly follow a fourth shaped conductor of another of the groups of the second type in terms of the series connection is arranged in that winding zone in which the third shaped conductor of the other of the groups of the second type is arranged. Therefore, in particular, a lap component of the combined lap and wave winding can be formed.

Also it can be provided that, at the stator according to the invention, some of the shaped conductors form groups of a third type of four shaped conductors, successive in terms of the series connection, which are designated in their order in terms of the series connection, wherein a first shaped conductor of a respective one of the groups of the third type is arranged in the third layer of one of the first winding zones, a second shaped conductor of a respective one of the groups of the third type is arranged in the fourth layer of a winding zone adjacent, along the second circumferential direction, to the winding zone in which the first shaped conductor is arranged, a third shaped conductor of a respective one of the groups of the third type is arranged in the second layer of the winding zone in which the first shaped conductor is arranged, and a fourth shaped conductor of a respective one of the groups of the third type is arranged in the first layer of the winding zone in which the second shaped conductor is arranged. A respective group of the third type can therefore form, in particular, a lap component of the combined lap and wave winding, the lap component being wound oppositely to the lap component formed by the groups of the first type.

In this case, the second section of the second path can be formed from a plurality of groups of the third type connected in series.

Furthermore, it can be advantageously provided that the first shaped conductor of such groups of the third type which directly follow a fourth shaped conductor of another of the groups of the third type in terms of the series connection can be arranged in that winding zone which follows, along the second circumferential direction, the winding zone in which the fourth shaped conductor is arranged. Therefore, in particular, a wave component, advancing along the second circumferential direction, of the combined lap and wave winding can be formed.

According to a first advantageous exemplary embodiment of the stator according to the invention, the first section and the third section of a respective path can extend around the stator core along the first circumferential direction and the second section of a respective path can extend around the stator core along the second circumferential direction at least in sections, in particular completely. Therefore, a reversal in the circumferential direction of the stator winding can be provided both at the transition from the first section to the second section and at the transition from the second section to the third section. A change in sub-winding zone can also take place at each of the transitions.

In this case, the second section of the first path is preferably formed from a plurality of, in particular from P, groups of the second type connected in series. The first shaped conductor of that group of the second type which follows one of the groups of the first type of the first section in terms of the series connection is expediently arranged in that winding zone which is adjacent, along the first circumferential direction, to that winding zone in which the fourth shaped conductor of the group of the first type is arranged. The first shaped conductor of that group of the first type which follows one of the groups of the second type of the second section in terms of the series connection is expediently arranged in that winding zone in which the third shaped conductor of the group of the second type is arranged.

In the case of the first exemplary embodiment, some of the shaped conductors can form a semigroup of the first type, wherein a first shaped conductor of the semigroup of the first type is arranged in the first layer of one of the winding zones and a second shaped conductor of the semigroup of the first type is arranged in the second layer of a winding zone adjacent, along the first circumferential direction, to the winding zone in which the first shaped conductor is arranged. In this case, it is preferred that the first section of the second path is formed from a of, in particular P/2, groups of the first type and a semigroup of the first type which directly follows an outer fourth shaped conductor, in terms of the series connection, of the groups of the first type, and the first shaped conductor of the first semigroup is arranged in a winding zone which follows, along the first circumferential direction, the winding zone in which the outer fourth shaped conductor, in terms of the series connection, of the group of the first type is arranged.

It may also be provided that some of the shaped conductors can form a semigroup of the second type, wherein a first shaped conductor of the semigroup of the second type is arranged in the fourth layer of one of the winding zones and a second shaped conductor of the semigroup of the second type is arranged in the third layer of a winding zone adjacent, along the first circumferential direction, to the winding zone in which the first shaped conductor is arranged. In this case, it is preferred when the third section of the second path is formed from a semigroup of the second type and at least one group of the first type, in particular (P/2)–1 groups of the first type, which directly follows the second shaped conductor of the semigroup of the second type in terms of the series connection, and the first shaped conductor of that group of the first type which directly follows the second shaped conductor of the semigroup of the second type in terms of the series connection is arranged in that winding zone which follows, along the first circumferential direction, the winding zone in which the second shaped conductor of the semigroup of the second type is arranged.

The semigroups of the first and second type can have the effect that the transitions between the first section and the second section or between the second section and the third section of both paths lie between different pairs of adjacent winding zones.

In particular in the case of the first development, it is advantageous when the first end shaped conductors of the first and second path are arranged in different sub-winding zones, in particular of the same winding zone, and the second end shaped conductors of the first and second path are arranged in different sub-winding zones, in particular of the same winding zone. Both paths can then be contacted in a space-saving manner. It is particularly preferred when the first end shaped conductors of the first and second path are arranged in the same layer and the second end shaped conductors of the first and second path are arranged in the same layer.

According to an advantageous second development of the stator according to the invention, the first path can extend around the stator core along the first circumferential direction and the second path to extend around the stator core along the second circumferential direction. Consequently, in the case of the second development, no reversal of the circumferential direction of the sections of a respective path is provided. Therefore, the first to third section of a respective path can extend along the same circumferential direction.

In this case, it is preferred that the second section of the first path is formed from a plurality of, in particular P, groups of the first type connected in series. The first shaped conductor of that group of the first type which follows one of the groups of the first type of the first section in terms of the series connection is expediently arranged in that winding zone which is adjacent, along the first circumferential direction, to that winding zone in which the fourth shaped conductor of the group of the first type of the first section is arranged. The first shaped conductor of that group of the first type which follows one of the groups of the first type of the second section in terms of the series connection is expediently arranged in that winding zone which is adjacent, along the first circumferential direction, to that winding zone in which the fourth shaped conductor of the group of the first type of the second section is arranged.

In the second exemplary embodiment, it can be provided that some of the shaped conductors form a semigroup of the first type, wherein a first shaped conductor of the semigroup of the first type is arranged in the second layer of one of the winding zones and a second shaped conductor of the semigroup of the first type is arranged in the first layer of a winding zone adjacent, along the second circumferential direction, to the winding zone in which the first shaped conductor is arranged. In this case, it is preferred that the first section of the second path is formed from a plurality of, in particular P/2, groups of the second type and a semigroup of the first type which directly follows an outer fourth shaped conductor, in terms of the series connection, of the groups of the second type and the first shaped conductor of the first semigroup is arranged in that winding zone in which the third shaped conductor of the outer of the groups, in terms of the series connection, of the second type is arranged.

As an alternative or in addition, some of the shaped conductors can form a semigroup of the second type, wherein a first shaped conductor of the semigroup of the second type is arranged in the third layer of one of the winding zones and a second shaped conductor of the semigroup of the second type is arranged in the fourth layer of a winding zone adjacent, along the second circumferential direction, to the winding zone in which the first shaped conductor is arranged. In this case, it is preferred when the third section of the second path is formed from a semigroup of the second type and at least one group of the second type, in particular (P/2)–1 groups of the second type, which directly follows the second shaped conductor of the semigroup of the second type in terms of the series connection, and the first shaped conductor of that group of the second type which directly follows the second shaped conductor of the semigroup of the second type in terms of the series connection is arranged in that winding zone in which the first shaped conductor of the semigroup of the second type is arranged.

The semigroups of the first and second type can have the effect that the transitions between the first section and the second section or between the second section and the third section of both paths lie between different pairs of adjacent winding zones.

In particular in the case of the second embodiment, it is advantageous when the first end shaped conductors of the first and second path are arranged in the same sub-winding zone and the second end shaped conductors of the first and the second path are arranged in the same sub-winding zone. The first end shaped conductors of the first and second path are particularly preferably arranged in directly adjacent layers and the second end shaped conductors of the first and second path are arranged in directly adjacent layers. As a result, a compact connection window can be implemented.

In the stator according to the invention, it can also be provided that the connectors are alternately formed as connectors of the first type, which are arranged at a first face side of the stator core, and as connectors of the second type, which are arranged at the second face side of the stator core. In this case, the first and second end shaped conductors of a respective path are preferably connected to the adjacent shaped connector in terms of the series connection by connectors of the second type. In particular, the end shaped conductors can therefore be contacted or connected at the first face side, on which the connectors of the first type are also located.

In a preferred embodiment, the connectors of the first type can be formed in one piece with the shaped conductors connected by them and to extend away from the stator core at the first face side. The connectors of the first type and the shaped conductors connected by them are preferably formed from an electrically conductive rod, wherein the connector of the first type is formed, in particular, by bending the rod.

A respective first connector, the shaped conductors connected by it and the connecting elements, adjoining the shaped conductors, of two second connectors can consequently form a one-piece conductor segment which can also be referred to as a hairpin conductor or U-pin.

It is further preferred that the connectors of the first type are arranged in an imbricated manner. Owing to such an arrangement, also referred to as U-and-U imbrication, the installation space at the face sides can be efficiently used and a small winding overhang, that is to say a reduced axial extent of the connectors beyond the face side, can be implemented.

It is further advantageous when, in the case of a respective path, one of the connectors of the first type, which one connector connects the shaped conductors of different sections, is arranged axially within another connector of the first type, which other connector connects the shaped conductors of different sections. In particular, that connector of the first type which implements a small offset over several slots is arranged axially on the inside. Owing to such a topology—also called a U-inside-U topology, a small winding overhang can be implemented.

As an alternative or in addition, the connectors of the second type can comprise two connecting elements which adjoin the shaped conductors, connected by the connector of the second type, at the second face side in a manner extending away from the stator core and they can be electrically conductively connected to each other, in particular in a materially bonded manner. The shaped conductors and the connecting elements adjoining them can also be formed from the or an electrically conductive rod. The connecting elements can be formed by bending the rod. In particular, the bar is bent after being inserted into the stator core.

In the case of the stator according to the invention, all connectors which connect shaped conductors of the same section can implement an offset by N·q. That connector which connects the outer shaped conductors, in terms of the series connection, of the first section and the second section, and/or that connector which connects the outer shaped conductor, in terms of the series connection, of the second section and the third section preferably implements an offset differing from N·q by one. In particular, that connector which connects the outer shaped conductors of the first section and the second section of the first path implements an offset by N·q−1 slots and that connector which connects the outer shaped conductors of the second section and the third section of the first path implements an offset by N·q+1 slots. In the case of the first exemplary embodiment, that connector which connects the outer shaped conductors of the first section and the second section of the second path preferably implements an offset by N·q−1 slots and that connector which connects the outer shaped conductors of the second section and the third section of the second path preferably implements an offset by N·q+1 slots. In the case of the second exemplary embodiment, that connector which connects the outer shaped conductors of the first section and the second section of the second path preferably implements an offset by N·q+1 slots and that connector which connects the outer shaped conductors of the second section and the third section of the second path preferably implements an offset by N·q−1 slots.

The stator according to the invention can further comprise a connection device with phase connections and at least one star point. The stator can be supplied with electrical power by means of such connection devices in order to form a magnetic rotating field.

Here, the connection device can connect the paths of a respective phase in parallel in such a way that the first end shaped conductors are connected to the phase connections and the second end shaped conductors are connected to form a star point or to form two star points or that the second end shaped conductors are connected to the phase connections and the first end shaped conductors are connected to form a star point or two star points. As an alternative, the connection device can connect the paths of a respective phase in series in such a way that one of the end shaped conductors of one of the paths is connected to the phase connections and one of the end shaped conductors of the other of the paths is connected to the star point.

A connection element preferably adjoins the first end shaped conductor and/or the second end shaped conductor at the first face side and a connecting element of a connector of the second type preferably adjoins the first end shaped conductor and/or the second end shaped conductor at the second face side. Such an arrangement can also be referred to as an I pin. The connection element preferably extends further in the axial direction than the connectors of the first type. The connection elements are preferably contacted by the connection device.

The object on which the invention is based is further achieved by an electric machine for driving a vehicle, comprising a stator according to the invention and a rotor rotatably mounted within the stator. The electric machine is preferably an electric motor. The electric machine can be, for example, a synchronous machine with permanent excitation or a synchronous motor with permanent excitation or an asynchronous machine/induction machine or an asynchronous motor.

Further advantages and details of the present invention can be gathered from the exemplary embodiments described below and on the basis of the drawings. The drawings are schematic illustrations in which:

FIG. 3 shows a winding diagram according to the first exemplary embodiment;

FIG. 1 is a basic diagram of a stator 1.

Figure 1:
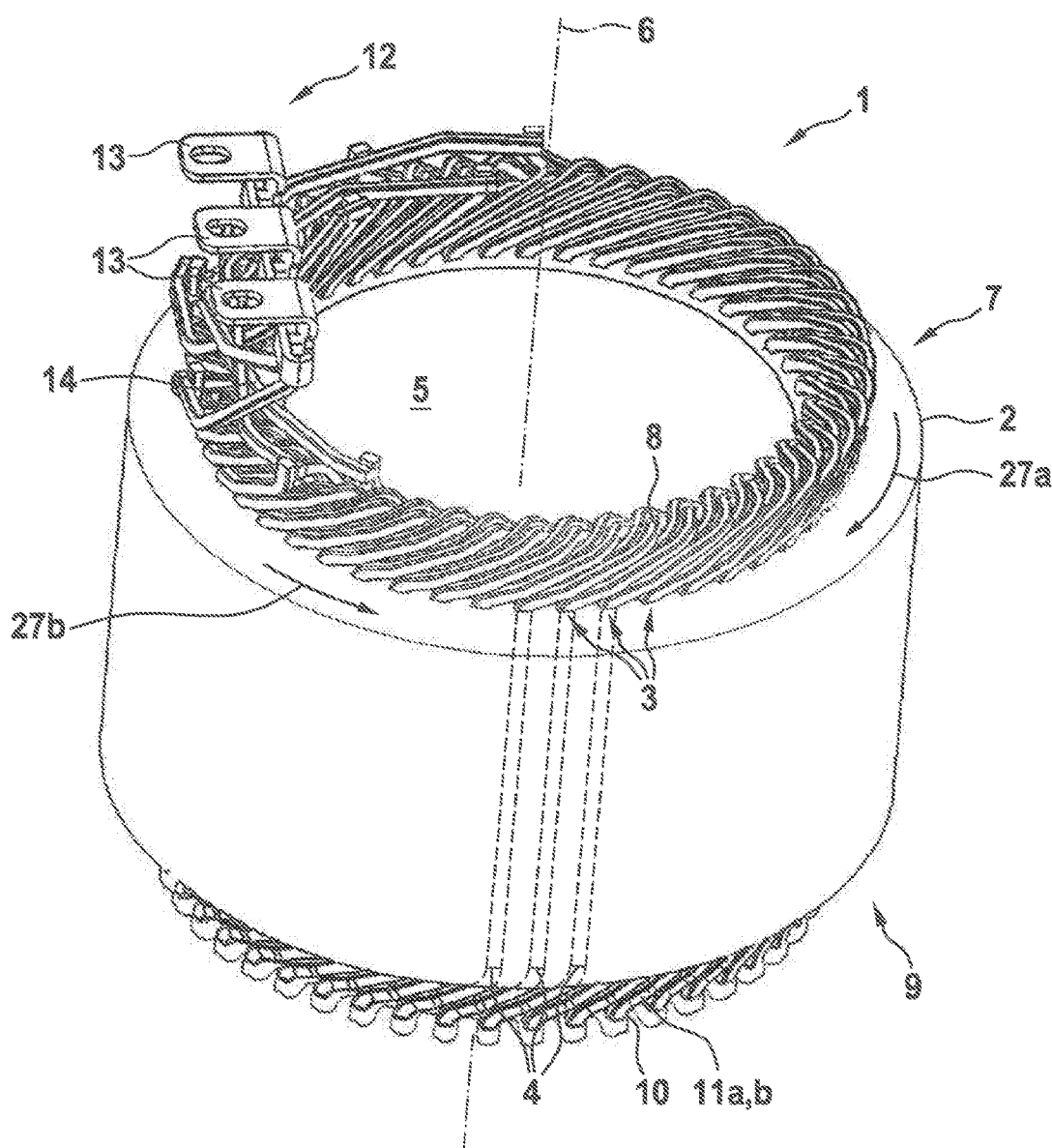
FIG. 1 shows a basic diagram of a stator.

The stator 1 has a stator core 2, which has a plurality of substantially axial slots 3 which are arranged in the stator core 3 along a first circumferential direction 27a or a second circumferential direction 27b opposite to the first circumferential direction. In addition, the stator 1 has a plurality of shaped conductors 4 which are arranged in the slots 3 in a layered manner. The shaped conductors 4 extend through the slots 3 completely in the axial direction, that is to say parallel to a centre axis 6 passing through a receiving space 5 for a rotor. The slots 3 likewise extend parallel to the centre axis 6. The slots 3 are formed as recesses in the stator core 2 and connected to the receiving space 5 through slot openings in the stator core 2.

At a first face side 7 of the stator 1, the shaped conductors 4 are connected in pairs by connectors of the first type 8. The connectors of the first type 8 are formed in one piece with the pair of shaped conductors 4 here and create a bend through 180°. At a second face side 9 of the stator 1, the pair of shaped conductors 4 are connected to another pair of shaped conductors 4 by connectors of the second type 8. A respective connector of the second type 10 comprises two bent connecting elements 11a, 11 b which adjoin the connected shaped conductors 4 in one piece and are connected to connecting elements 11a, 11b of other connectors of the second type 10. Here, the connection is formed in a materially bonded manner, in particular by welding. The shaped conductors 4 and the connectors 8, form a stator winding of the stator 1.

FIG. 1 further shows a connection device 12 which forms phase connections 13 and a star point 14 or a plurality of star points of the stator winding.

Figure 2:
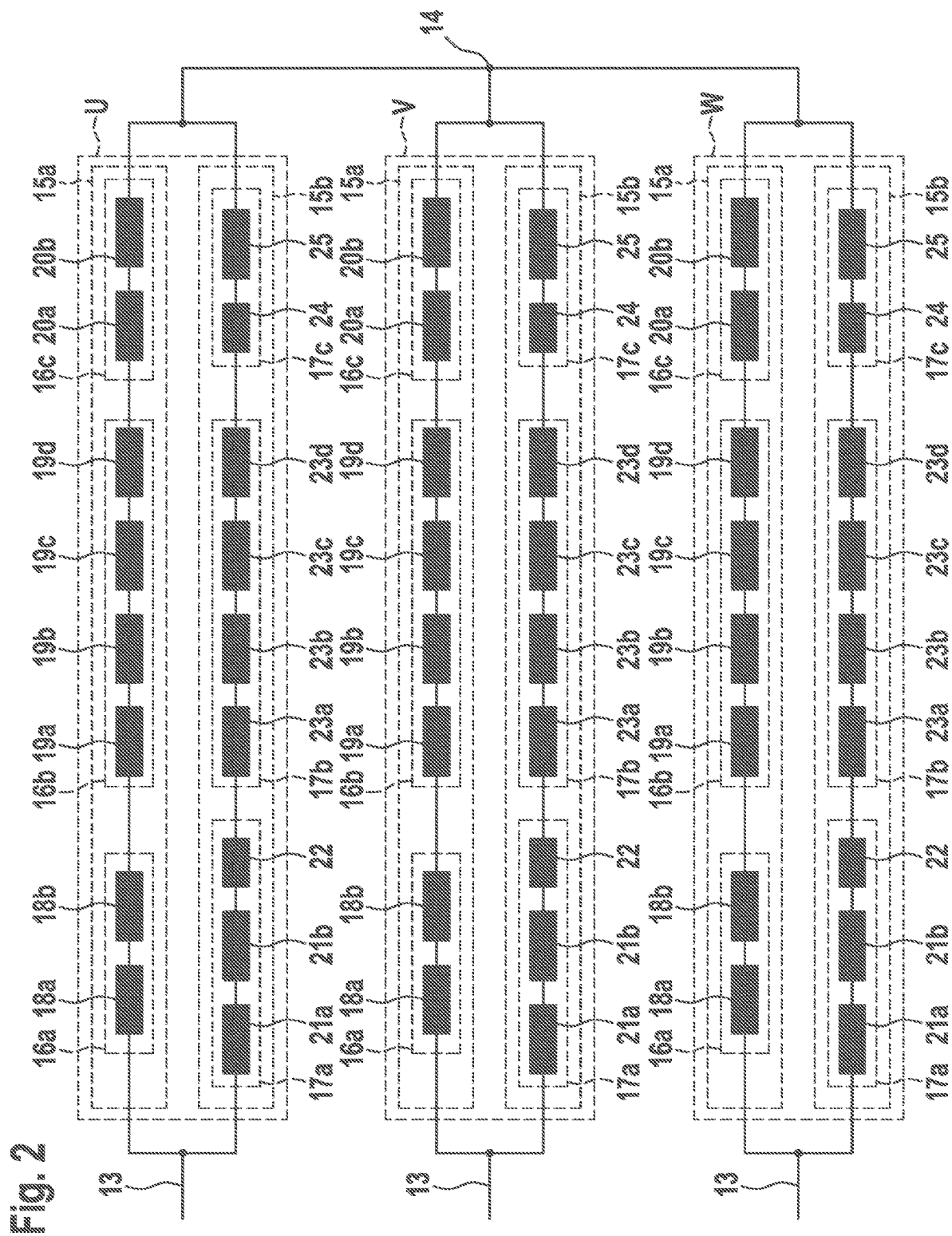
FIG. 2 shows a block circuit diagram of the stator winding of a first exemplary embodiment of the stator according to the invention.

FIG. 2 shows a block circuit diagram of a stator winding according to a first exemplary embodiment of a stator 1, to which the statements made in relation to the stator 1 shown in FIG. 1 can be applied.

The stator 1 according to the first exemplary embodiment has, in the exemplary configuration shown, N=3 phases U, V, W and P=4 pole pairs and also a hole count q=2. The shaped conductors 4 form a first path 15a and a second path 15b for each phase U, V, W. The paths 15a, 15b of a respective phase U, V, W are connected in parallel by means of the connection device 12. The shaped conductors 4 of a respective path 15a, 15b are connected in series. For each of the phases U, V, W, the paths 15a, 15b are constructed as follows:

The shaped conductors 4 of the first path 15a form, in the order from the phase connection 13 to the star point 14, a first section 16a, a second section 16b and a third section 16c. Similarly, the shaped conductors 4 of the second path 15b form, in the order from the phase connection 13 to the star point 14, a first section 17a, a second section 17b and a third section 17c.

The shaped conductors 4 of the first section 16a of the first path 15a form first to [(P/2)-th] groups of the first type 18a, 18b of shaped conductors 4 connected in series, here a first group of the first type 18a and a second group of the first type 18b. The shaped conductors 4 of the second section 16b of the first path 15a form first to P-th groups of the second type 19a-d of shaped conductors 4 connected in series, here a first group of the second type 19a, a second group of the second type 19b, a third group of the second type 19c and a fourth group of the second type 19d. The shaped conductors 4 of the third section 16c of the first path 15a form first to [(P/2)-th] groups of the first type 20a, 20b of shaped conductors 4 connected in series, here a first group of the first type 20a and a second group of the first type 20b.

The shaped conductors 4 of the first section 17a of the second path 15b form first to [(P/2)-th] groups of the first type 21a, 21 b of shaped conductors 4 connected in series, here a first group of the first type 21a and a second group of the first type 21b, and also a semigroup of the first type 22 which, on its side averted from the second section 17b, is connected in series to the groups of the first type 21a, 21b. The shaped conductors 4 of the second section 17b of the second path 15b form first to P-th groups of the third type 23a-d of shaped conductors 4 connected in series, here a first group of the third type 23a, a second group of the third type 23b, a third group of the third type 23c and the fourth group of the third type 23d. The shaped conductors 4 of the third section 17c of the second path 15a form a semigroup of the second type 24 and also first to [(P/2-1)-th] groups of the first type 25 of shaped conductors 4 connected in series, here a (first) group of the first type 25 which, on its side which faces the second section 17b, is connected in series to the semigroup of the second type 24.

Here, the sections 16a-c, 17a-c and the groups of the first, second and third type 18a, 18b, 19a-d, 20a, 20b, 21a, 23a-d, 25 are designated in their respective order in terms of the series connection, here counted from the phase connection 13 to the star point 14.

Figure 3:
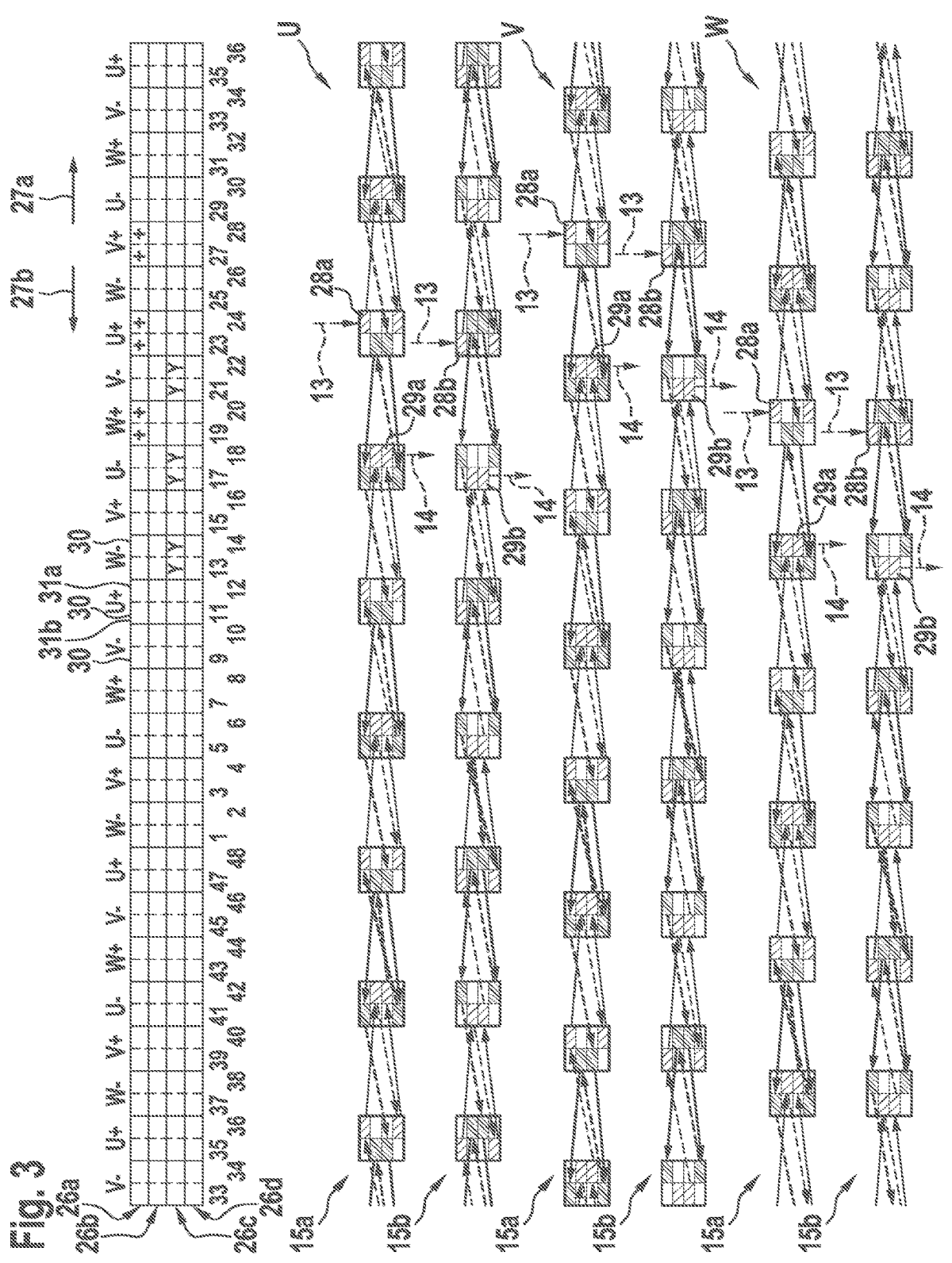

FIG. 3 shows a winding diagram of the stator winding according to the first exemplary embodiment.

The stator 1 has a hole count q=2. In the present case, this results in a total number of 2·P·N·q=48 slots 3. The hole count q therefore describes the ratio of the number of slots 3 to the product of the number of poles 2·P and the number of phases N.

Here, the shaped conductors 4 are arranged in a first layer 26a, a second layer 26b, a third layer 26c and a fourth layer 26d, wherein the layers 26a-d are designated in accordance with their order from radially on the outside to radially on the inside. Consequently, the first layer 26a is the radially outermost layer and the fourth layer 26d is the radially innermost layer of the four layers 26a-d. Precisely one shaped conductor 4 is arranged in each layer 26a-d of a respective slot 3. In other words, each layer 26a-d of a respective slot 3 forms a receiving space for precisely one shaped conductor 4. This results in a number of, in total, 2·P·N·q·L=192 receiving spaces or shaped conductors 4 of the stator 1, where L describes the number of layers 26a-d.

FIG. 3 shows, using two arrows arranged above the upper table, the first circumferential direction 27a, which corresponds to the clockwise direction as seen from the first face side 7 of the stator 1, and the second circumferential direction 27b, which corresponds to the anti-clockwise direction as viewed from the first face side 7 of the stator 1, (also see FIG. 1). FIG. 3 further shows slot numbering from 1 to 48 below the upper table. The upper table in FIG. 3 shows which phase U, V, W a shaped conductor 4 arranged in a respective receiving space belongs to, where the addition of a "+" or "−" denotes a direction of flow of an electric current through the shaped conductor 4 in question.

Furthermore, receiving spaces for a first end shaped conductor 28a of a respective first path 15a and also for a first end shaped conductor 28b of a respective second path 15b are identified by an "X" in the upper table. The first end shaped conductors 28a, 28b are connected to the phase connection 13. In addition, receiving spaces for a second end shaped conductor 29a of a respective first path and also for a second end shaped conductor 29b, in terms of the series connection, of a respective second path 15b are identified by a "Y". The second end shaped conductors 29a, 29b are connected to the star point 14. The first end shaped conductor 28a, 28b and the second end shaped conductor 29a, 29b of a respective path 15a, 15b are the outer conductors 4, in terms of the series connection, of the path 15a, 15b.

It is clear that the shaped conductors of each phase U, V, W are arranged in 2·P=8 winding zones 30 which each comprise precisely q·L=8 receiving spaces. Each winding zone 30 is subdivided into q=2 sub-winding zones 31a, 31b. In each winding zone 30, the first sub-winding zone 31a follows the second sub-winding zone 31b along the first circumferential direction 27a. Each sub-winding zone 31a, 31b extends over all four layers 26a-d. In the present exemplary embodiment, each sub-winding zone 31a, 31b lies in precisely one slot 3 by way of example.

Between the receiving spaces of the shaped conductors 4, the connectors of the first type 8 are identified by dashed arrows and the connectors of the second type 10 are identified by solid arrows. The shaped conductors of a respective path 15a, form a combined lap and wave winding. Here, the illustration of the shaped conductors 4 and the connectors 8, 10 for the phase U is representative of the other phases V, W in which the arrangement of the shaped conductors 4 and connectors 8, 10, apart from a shift by q=2 slots 3, corresponds to that of the phase U. In the text which follows, the structure of the stator winding is explained based on the phase U.

Figure 4:
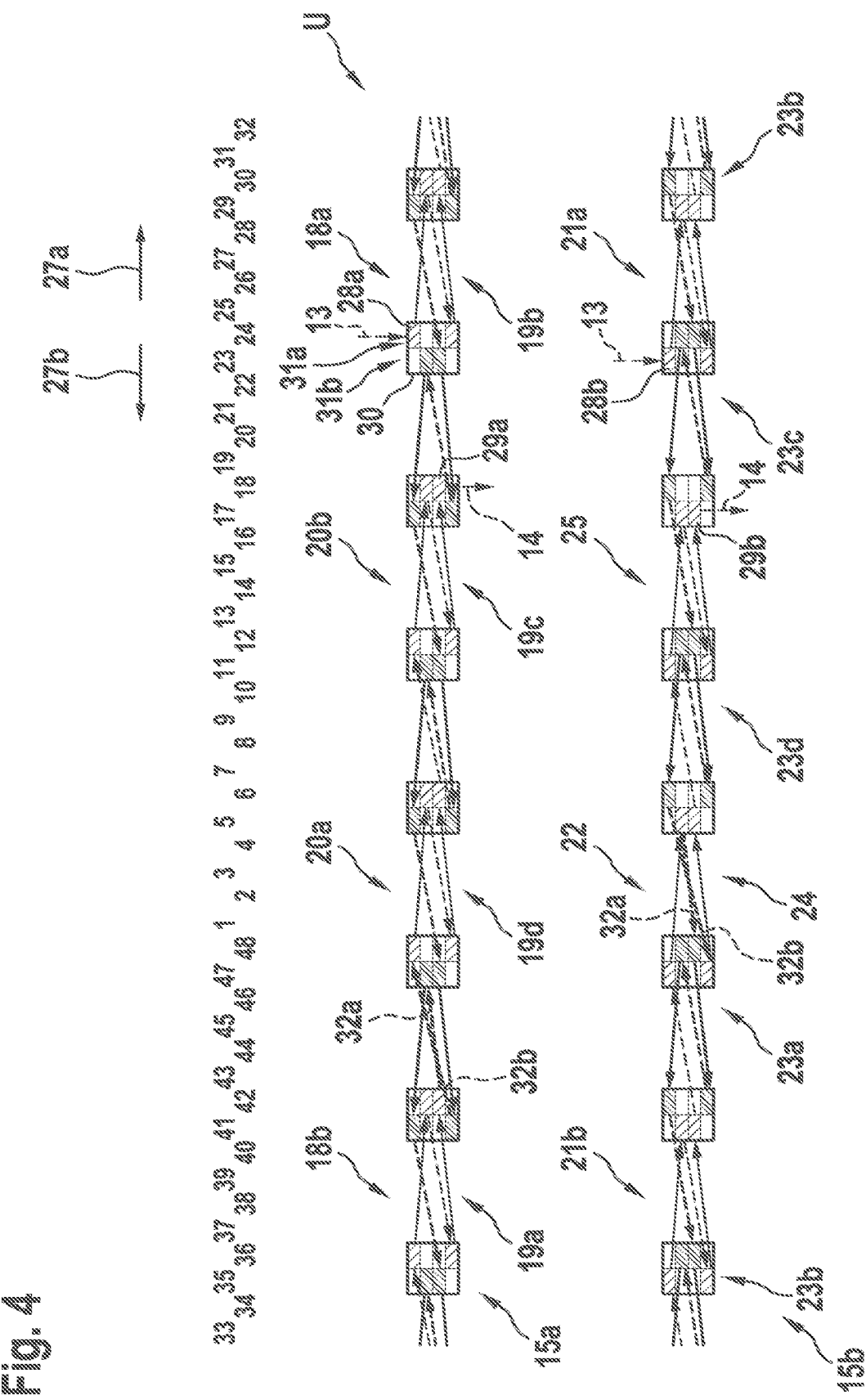
FIG. 4 shows an illustration of a detail of the winding diagram for one phase.

FIG. 4 shows a view of a detail of the winding diagram for the phase U.

According to the first exemplary embodiment, in the first path 15a, the shaped conductors 4 of the first section 16a, that is to say those of the groups of the first type 18a, 18b, and also the shaped conductors 4 of the third section 16c, that is to say those of the groups of the first type 20a, 20b, are each arranged in the first sub-winding zone 31a and the shaped conductors 4 of the second section, that is to say those of the groups of the second type 19a-d, are arranged in the second sub-winding zone 31b. In the second path 15b, the shaped conductors 4 of the first section 17a, that is to say those of the groups of the first type 21a, 21b and the semigroup of the first type 22, and also of the third section 17c, that is to say the semigroup of the second type 24 and the group of the first type 25, are arranged in the second sub-winding zone 31b and the shaped conductors 4 of the second section 16b, that is to say those of the groups of the third type 23a-d, are however each arranged in the first sub-winding zone 31a. The first end shaped conductors 28a, 28b of the first and the second path 15a, 15b are arranged in different sub-winding zones and the second end shaped conductors 29a, 29b of the first and second path 15a, 15b are arranged in different sub-winding zones 31a, 31 b. Here, the first end shaped conductor 28a and the second end shaped conductor 29a are arranged in the first sub-winding zone 31a, while the first end shaped conductor 28b and the second end shaped conductor 29b are arranged in the second sub-winding zone 31a.

It is further clear from FIG. 4 that the first and third sections 16a, 16c, 17a, 17c of both paths 15a, 15b extend around the stator core 2 along the first circumferential direction 27a, while the second sections 16b, 17b of both paths 15a, 15b extend around the stator core 2 along the second circumferential direction 27b. Therefore, a reversal in the circumferential direction of the stator winding takes place from the first section 16a, 17a to the second section 16b, 17b of a respective path 15a, 15b and also from the second section 16b, 17b to the third section 16c, 17c of a respective path 15a, 15b.

Therefore, a change in the sub-winding zones 31a, 31 b also takes place from the first section 16a, 17a to the second section 16b, 17b of a respective path 15a, 15b and also from the second section 16b, 17b to the third section 16c, 17c of a respective path 15a, 15b. Connectors separately denoted by 32a, 32b and formed here as connectors of the first type 8 are provided for this purpose. The connector 32a, which connects the shaped conductors 4 of the first section 16a, 17a and the second section 16b, 17b of a respective path 15a, 15b, implements an offset by q·N−1=5 slots 3 here, while the connector 32b, which connects the shaped conductors 4 of the second section 16b, 17b and the third section 16c, 17c of a respective path 15a, 15b, implements an offset by q·N+1=7 slots 3. The other connectors 8, 10 each implement an offset by q·N=6 slots 3.

The first and third sections 16a, 16c, 17a, 17c each execute substantially a half-turnaround around the stator core 2, while the second sections 16b, 17b each execute substantially a complete turnaround around the stator core 2. In the first path 15a, the first section 16a extends over P=4 winding zones 30, the second section 16b extends over 2·P+2=10 winding zones 30 and the third section 16c extends over P=4 winding zones. In the second path 15b, the first section 17a extends over P+2=6 winding zones, the second section 17b extends over 2·P=8 winding zones 30 and the third section 17c extends over P=4 winding zones. In this case, the sections 16a-c, 17a-c partially overlap, so that the sum of the winding zones 30 over which the sections 16a-c, 17a-c of a respective path 15a, extend is greater than twice the number of poles.

Figure 5:
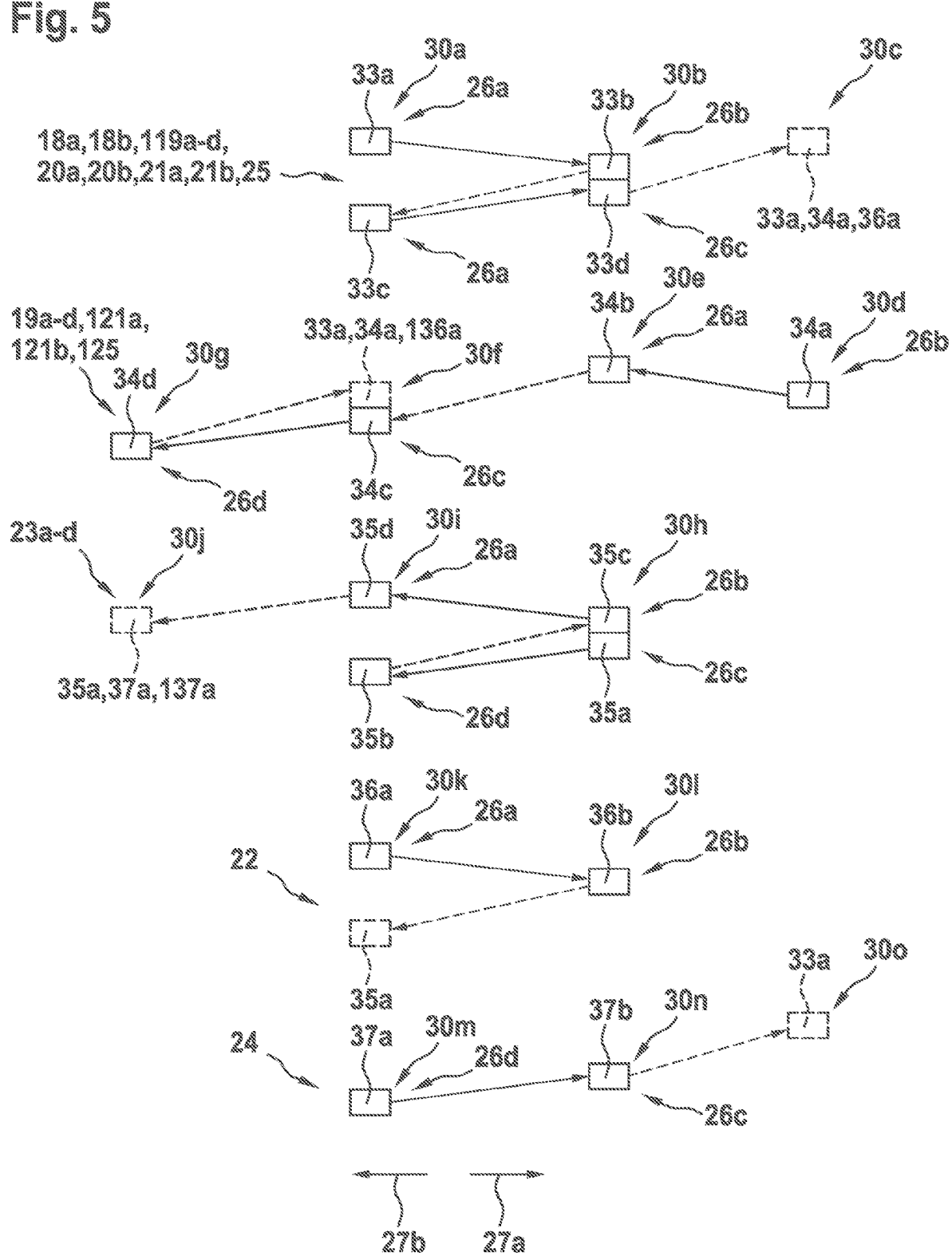
FIG. 5 shows an illustration of a detail of the groups and semigroups of shaped conductors according to the first exemplary embodiment.

FIG. 5 is an illustration of a detail of the groups 18a, 18b, 19a-d, 20a, 20b, 21a, 21 b, 23a-d, 25 and semigroups 22, 24 of shaped conductors 4 according to the first exemplary embodiment.

The groups of the first type 18a, 18b, 20a, 20b, 21a, 21 b, 25 comprise four shaped conductors 4, successive in terms of the series connection, which are separately denoted by 33a-d. Furthermore, in FIG. 5, three adjacent winding zones 30 are separately denoted by 30a-c. In the groups of the first type 18a, 18b, 20a, 20b, 21a, 21 b, 25, a first shaped conductor 33a is arranged in the first layer 26a of one of the winding zones 30a, a second shaped conductor 33b is arranged in the second layer 26b of a winding zone 30b adjacent, along the first circumferential direction 27a, to the winding zone 30a in which the first shaped conductor 33a is arranged, a third shaped conductor 33c is arranged in the fourth layer 26d of the winding zone 30a in which the first shaped conductor 33a is arranged, and a fourth shaped conductor 33d is arranged in the third layer 26c of the winding zone 30b in which the second shaped conductor 33b is arranged.

The groups of the second type 19a-d comprise four shaped conductors 4, successive in terms of the series connection, which are separately denoted by 34a-d. Furthermore, in FIG. 5, four adjacent winding zones 30 are separately denoted by 30c-f. In the groups of the second type 19a-d, a first shaped conductor 34a is arranged in the second layer of one of the winding zones 30c, a second shaped conductor 34b is arranged in the first layer 26a of a winding zone 30d adjacent, along the second circumferential direction 27b, to the winding zone 30c in which the first shaped conductor 34a is arranged, a third shaped conductor 34c is arranged in the third layer 26c of a winding zone 30e adjacent, along the second circumferential direction 27b, to the winding zone 30*d* in which the second shaped conductor 34*b* is arranged, and a fourth shaped conductor 34*d* is arranged in the fourth layer 26*d* of a winding zone 30*f* adjacent, along the second circumferential direction 27*b*, to the winding zone 30*e* in which the third shaped conductor 34*c* is arranged.

The groups of the third type 23*a-d* comprise four shaped conductors 4, successive in terms of the series connection, which are separately denoted by 35*a-d*. Furthermore, in FIG. 5, three adjacent winding zones 30 are separately denoted by 30*h-j*. In the groups of the third type 23*a-d*, a first shaped conductor 35*a* is arranged in the third layer 26*c* of one of the winding zones 30*h*, a second shaped conductor 35*b* is arranged in the fourth layer 26*d* of a winding zone 30*i* adjacent, along the second circumferential direction 27*b*, to the winding zone 30*h* in which the first shaped conductor 35*a* is arranged, a third shaped conductor 35*c* is arranged in the second layer 26*b* of the winding zone 30*h* in which the first shaped conductor 35*a* is arranged, and a fourth shaped conductor 35*d* is arranged in the first layer 26*a* of the winding zone 30*i* in which the second shaped conductor 35*b* is arranged.

The semigroup of the first type 22 comprises two shaped conductors 4, successive in terms of the series connection, which are separately denoted by 36*a*, 36*b*. Furthermore, in FIG. 5, two adjacent winding zones 30 are separately denoted by 30*k*, 30*l*. In the semigroup of the first type 22, a first shaped conductor 36*a* is arranged in the first layer 26*a* of one of the winding zones 30*k* and a second shaped conductor 36*b* is arranged in the second layer 26*b* of a winding zone 30*l* adjacent along the first circumferential direction 27*a* to the winding zone 30*k* in which the first shaped conductor 36*a* is arranged.

The semigroup of the second type 24 comprises two shaped conductors 4, successive in terms of the series connection, which are separately denoted by 37*a*, 37*b*. Furthermore, in FIG. 5, three adjacent winding zones 30 are separately denoted by 30*m-o*. In the semigroup of the second type 24, a first shaped conductor 37*a* is arranged in the fourth layer 26*d* of one of the winding zones 30*m* and a second shaped conductor 37*b* is arranged in the third layer 26*c* of a winding zone 30*n* adjacent along the first circumferential direction 27*a* to the winding zone in which the first shaped conductor 37*a* is arranged.

The first shaped conductor 33*a* of such groups of the first type 18*b*, 20*b*, 21*b* which directly follow a fourth shaped conductor 33*d* of another of the groups of the first type 18*a*, 20*a*, 21*a* in terms of the series connection is arranged in that winding zone 30*c* which follows, along the first circumferential direction 27*a*, the winding zone 30*b* in which the (P/2)-th (fourth) shaped conductor 33*d* is arranged. Furthermore, the first shaped conductor 36*a* of the semigroup of the first type 22 is arranged in that winding zone 30*c* which follows, along the first circumferential direction 27*a*, the winding zone 30*b* in which the fourth shaped conductor 33*d* of the second group of the first type 21*b* is arranged. Furthermore, the first shaped conductor 34*a* of the first group of the second type 19*a* which follows one of the groups of the first type 18*b* is arranged in that winding zone 30*c* which follows, along the first circumferential direction 27*a*, the winding zone 30*b* in which the fourth shaped conductor 33*d* of the group of the first type 18*b* is arranged.

The first shaped conductor 34*a* of such groups of the second type 19*b-d* which directly follow a fourth shaped conductor 34*d* of another of the groups of the second type 19*a-c* in terms of the series connection is arranged in that winding zone 30*f* in which the third shaped conductor 34*c* of the other group of the second type 19*a-c* is arranged. The first shaped conductor 33*a* of that group of the first type 20*a* which follows the fourth shaped conductor 34*d* of the P-th (fourth) group of the second type 19*d* in terms of the series connection is arranged in that winding zone 30*f* in which the third shaped conductor 34*c* of the group of the second type 19*d* is arranged.

The first shaped conductor 35*a* of such groups of the third type 23*b-d* which directly follow a fourth shaped conductor 35*d* of another of the groups of the third type 23*a-c* in terms of the series connection is arranged in that winding zone 30*j* which follows, along the second circumferential direction 27*b*, that winding zone 30*i* in which the fourth shaped conductor 35*d* of the other of the groups of the third type 23*a-c* is arranged. Furthermore, the first shaped conductor 37*a* of the semigroup of the second type 24 is arranged in that winding zone 30*j* which follows, along the second circumferential direction 27*b*, the winding zone 30*i* in which the fourth shaped conductor 35*d* of the group of the third type 23*d* is arranged.

The first shaped conductor 35*a* of that group of the third type 23*a* which follows the semigroup of the first type 22 in terms of the series connection is arranged in that winding zone 30*k* in which the first shaped conductor 36*a* of the semigroup of the first type 22 is arranged. The first shaped conductor 33*a* of that group of the first type 25 which follows the semigroup of the second type 24 is arranged in that winding zone 30*o* which follows that winding zone 30*n* along the first circumferential direction 27*a* in which the second shaped conductor 37*b* of the semigroup of the second type 24 is arranged.

Figure 6:
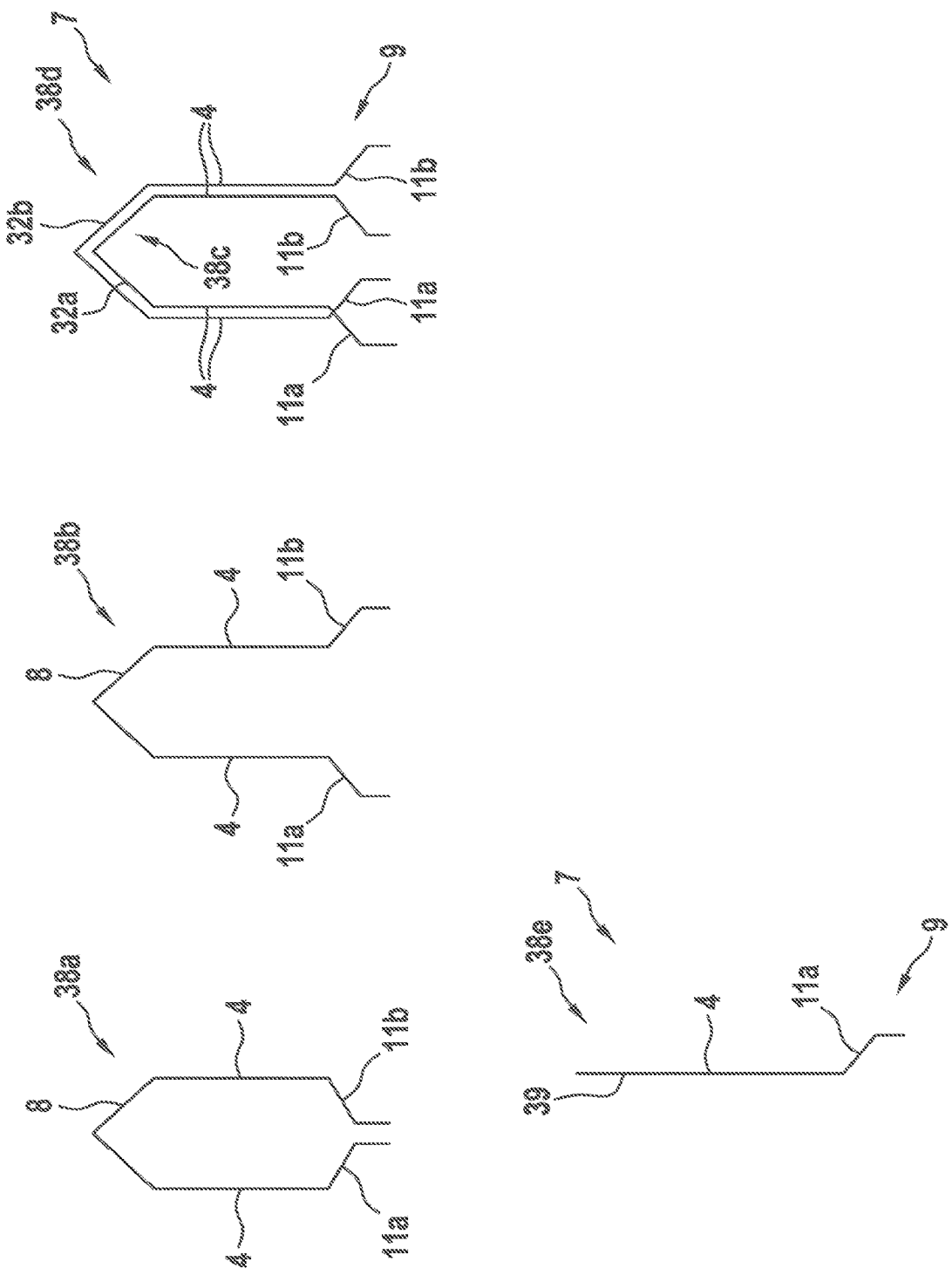
FIG. 6 shows a basic diagram of a plurality of conductor segments according to the first exemplary embodiment.

FIG. 6 is a basic diagram of a plurality of conductor segments 38*a-e* according to the first exemplary embodiment.

The conductor segments 38*a-d* are each formed from two shaped conductors 4, a connector of the first type 8, 32, 32*b* which adjoins the two shaped conductors 4 at the first face side 7 and connects them, and two connecting elements 11*a*, 11*b* which adjoin a respective one of the two shaped conductors 4 at the second face side 9. Here, the conductor segments 38*a-d* are formed in one piece by way of example, but alternatively can also be formed by joining separate components. In each case two connecting elements 11*a*, 11*b* of different conductor segments 38*a-e* form a connector of the second type 10.

In the conductor segment 38*a*, the connecting elements 11*a*, 11*b* point towards each other in opposite circumferential directions 27*a*, 27*b*. The
  connected second and third shaped conductors 33*b*, 33*c* of a respective group of the first type 18*a*, 18*b*, 20*a*, 20*b*, 21*a*, 21*b*, 25,
  the connected second and third shaped conductors 33*b*, 33*c* of a respective group of the third type 23*a-d* and
  the connected fourth and first shaped conductors 34*d*, 34*a* of different groups of the second type 19*a-d* are formed by conductor segments 38*a*.

In the conductor segment 38*b*, the conducting elements 11*a*, 11*b* point away from each other in opposite circumferential directions 27*a*, 27*b*. The
  connected fourth and first shaped conductors 33*d*, 33*a* of different groups of the first type 18*a*, 18*b*, 20*a*, 20*b*, 21*a*, 21*b*,
  the connected second and third shaped conductors 34*b*, 34*c* of a respective group of the second type 19*a-d*,
  the fourth shaped conductors 33*d* of the second [(P/2)-th] group of the first type 21*b* of the first section 17*a* of the second path 15b and the first shaped conductor 36a, connected thereto, of the semigroup of the first type 22 and also the second shaped conductor 37b of the semigroup of the second type 24 and the first shaped conductor 33a, connected thereto, of the (first) group of the first type 25 are formed by conductor segments 38b.

In the respective conductor segment 38c, 38d, the connecting elements 11a, 11 b have the same orientation. The connecting elements 11a, 11 b of the conductor segments 38c are oriented oppositely to those of the conductor segments 38d. Here, the connector of the first type 32a of the conductor segment 38c is arranged axially within the connector of the first type 32b of the conductor segment 38d. Therefore, the connector of the first type 32a is axially shorter than the connector of the first type 32b.

In the first path 15a, the outer shaped conductor 4, which faces the second section 16b, of the first section 16a, here the fourth shaped conductor 33d of the second [(P/2)-th)] group of the first type 18b, and the outer shaped conductor 4, which faces the first section 16a, of the second section 16b, here the first shaped conductor 34a of the first group of the second type 19a, are formed by a conductor segment 38c. In the second path 15b, the outer shaped conductor 4, which faces the second section 17b, of the first section 17a, here the second shaped conductor 36b of the semigroup of the first type 22, and the outer shaped conductor 4, which faces the first section 17a, of the second section 17b, here the first shaped conductor 35a of the first group of the third type 23a, are formed by a conductor segment 38c.

In the first path 15a, the outer shaped conductor 4, which faces the third section 16c, of the second section 16b, here the fourth shaped conductor 34d of the fourth (P-th) group of the second type 19d, and the outer shaped conductor 4, which faces the second section 16b, of the third section 16b, here the first shaped conductor 33a of the first group of the first type 20a, are formed by a conductor segment 38d. In the second path 15b, the outer shaped conductor 4, which faces the third section 17c, of the second section 17b, here the fourth shaped conductor 35b of the fourth (P-th) group of the third type 23d, and the outer shaped conductor 4, which faces the second section 17b, of the third section 17c, here the first shaped conductor 37a of the semigroup of the second type 24, are formed by a conductor segment 38d.

The conductor segment 38e comprises a shaped conductor 4, a connecting element 11a adjoining the shaped conductor 4 at the second face side 9 and a connection element 39 for making contact with the connection device 12 (see FIG. 1). The end shaped conductors 28a, 28b, 29a, 29b, in terms of the series connection, of a respective path 15a, 15b, that is to say here in the first path 15a the first shaped conductor 33a of the first group of the first type 18a of the first section 16a and the fourth shaped conductor 33d of the second [(P/2)-th] group of the first type 20b of the third section 16c and also in the second path the first shaped conductor 33a of the first group of the first type 21a of the first section 17a and the fourth shaped conductor 33d of the [(P/2-1)-th] group of the first type 25, are formed by conductor segments 38e.

FIG. 6 schematically shows the conductor segments 38a-e, in particular without precise illustration of the number of slots 3 by which the connectors of the first type 10, 32a, 32b or the connecting elements 11a, 11 b implement an offset. The conductor segments 38a-d can also be regarded as U-pins or hairpin conductors and the conductor segments 38e can be regarded as I-pins. The entire stator winding is then also referred to as a hairpin winding.

Figure 7:
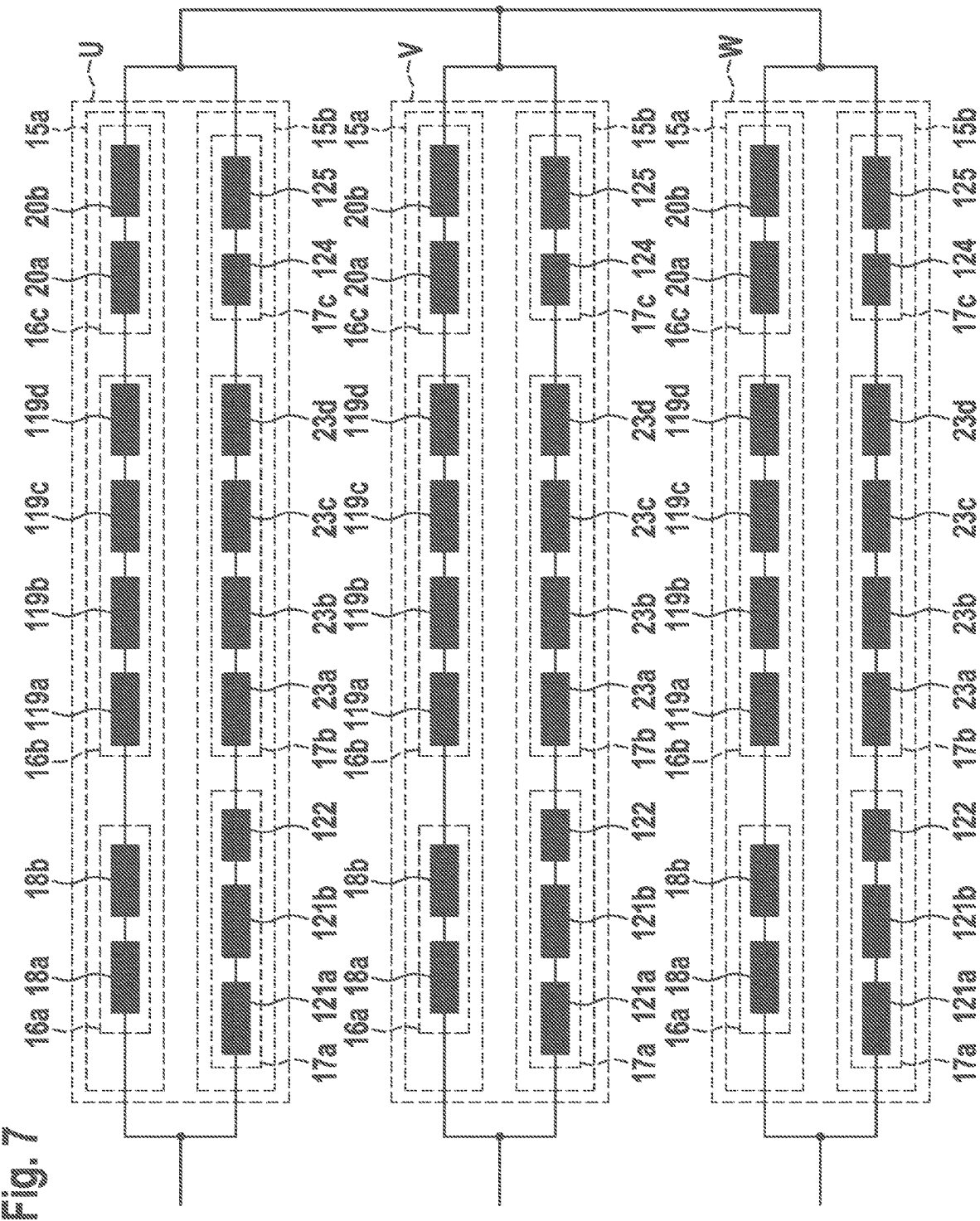
FIG. 7 shows a block circuit diagram of the stator winding of a second exemplary embodiment of the stator according to the invention.

FIG. 7 is a block circuit diagram of a stator winding according to a second exemplary embodiment of a stator 1. Provided nothing to the contrary is described hereinafter, all embodiments pertaining to the first exemplary embodiment can be applied to the second exemplary embodiment. Components that are the same or have the same effect are provided with identical reference signs here.

In the second exemplary embodiment, the shaped conductors 4 of the second section 16b of the first path 15a form first to P-th groups of the first type 119a-d, here a first group of the first type 119a, a second group of the first type 119b, a third group of the first type 119c and a fourth group of the first type 119d. The shaped conductors 4 of the first section 17a of the second path 15b form first to (P/2)-th groups of the second type 121a, 121b, here a first group of the second type 121a and a second group of the second type 121b, and also a semigroup of the first type 122 which, on its side which is averted from the second section 17b, is connected in series to the groups of the second type 121a, 121b. The shaped conductors 4 of the third section 17c of the second path 15a form a semigroup of the second type 124 and also first to [(P/2-1)-th] groups of the first type 125 of shaped conductors 4 connected in series, here a (first) group of the second type 125 which, on its side which faces the second section 17b, is connected in series to the semigroup of the second type 124. Here, the groups of the first type 119a-d and the groups of the second type 121a, 121b, 125 are also designated in their respective order in terms of the series connection, here counted from the phase connection 13 to the star point 14.

Figure 8:
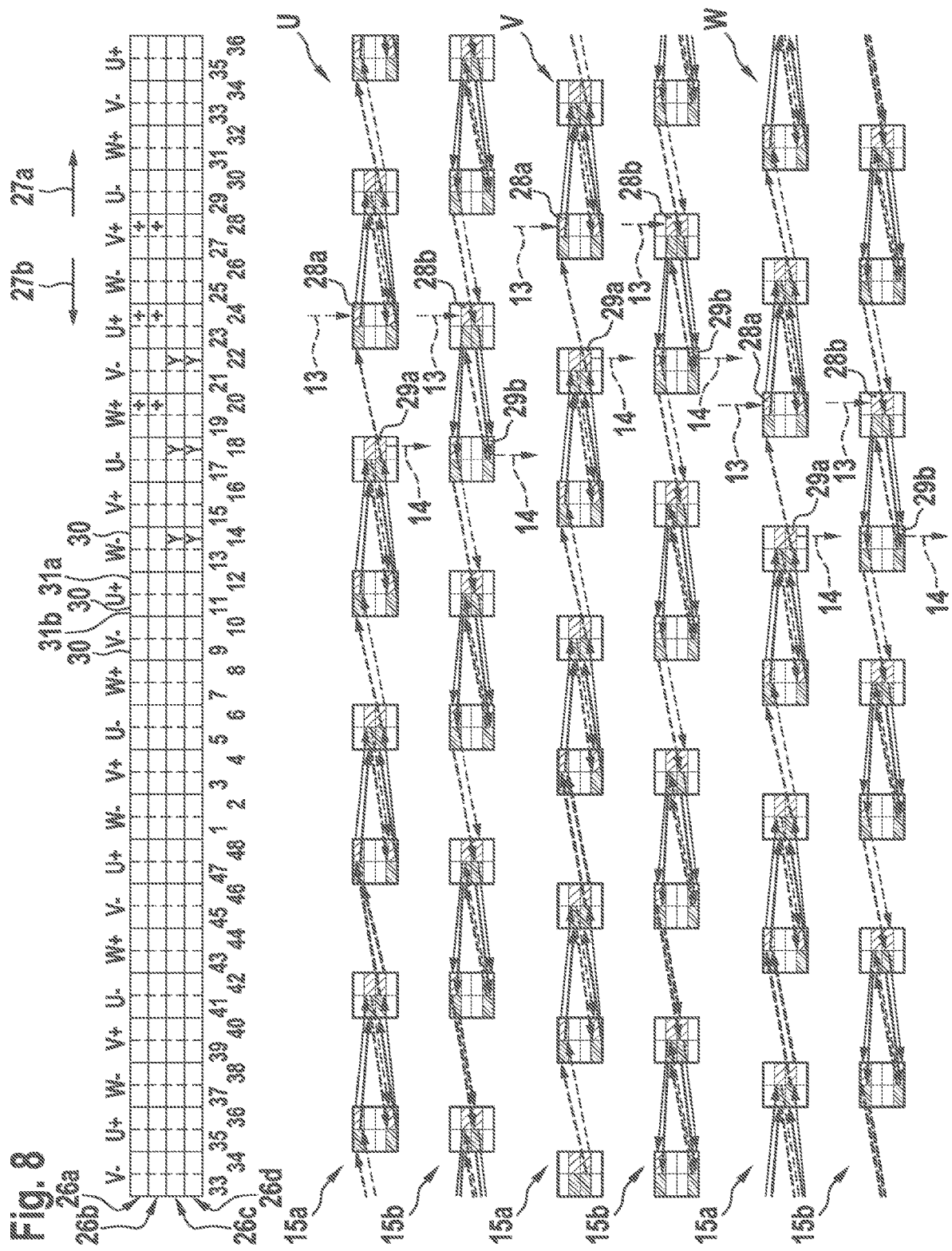
FIG. 8 shows a winding diagram according to the second exemplary embodiment.
Figure 9:
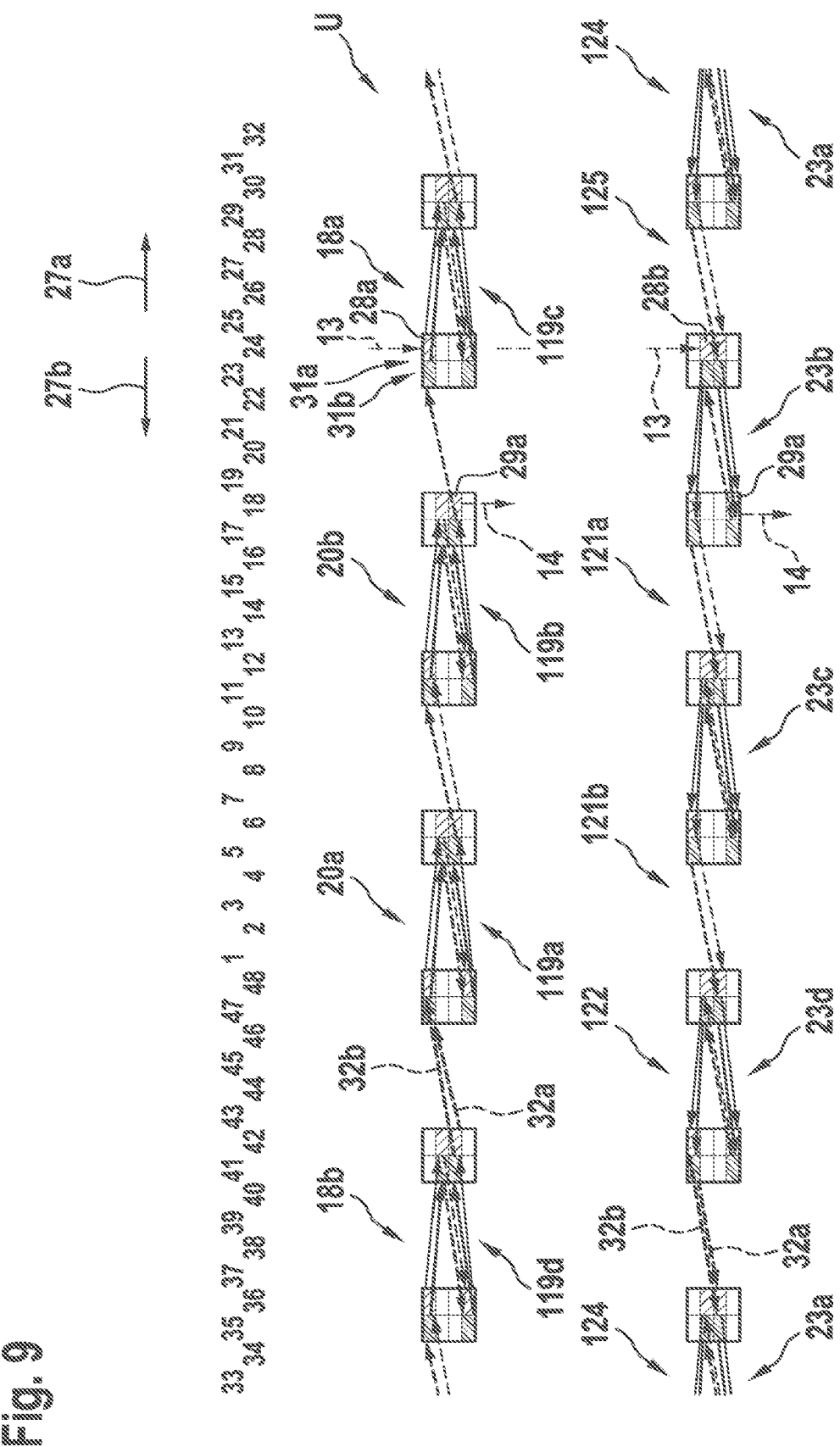
FIG. 9 shows an illustration of a detail of the winding diagram for one phase.

FIG. 8 is a winding diagram of the stator winding according to the second exemplary embodiment; FIG. 9 is a view of a detail of the winding diagram for the phase U which is also representative of the other phases V, W in the second exemplary embodiment.

According to the second exemplary embodiment, in the first path 15a, the shaped conductors 4 of the first section 16a, that is to say those of the groups of the first type 18a, 18b, and also the shaped conductors 4 of the third section 16c, that is to say those of the groups of the first type 20a, 20b, are each arranged in the first sub-winding zone 31a and the shaped conductors 4 of the second section, that is to say those of the groups of the second type 19a-d, are arranged in the second sub-winding zone 31b. In the second path 15b, the shaped conductors 4 of the first section 17a, that is to say those of the groups of the second type 121a, 121b and the semigroup of the first type 122, and also of the third section 17c, that is to say the semigroup of the second type 124 and the group of the second type 125, are arranged in the first sub-winding zone 31a and the shaped conductors 4 of the second section 16b, that is to say those of the groups of the third type 23a-d, are however each arranged in the second sub-winding zone 31b. The first end shaped conductors 28a, 28b of the first and the second path 15a, 15b are arranged in the same sub-winding zone 31a and the second end shaped conductors 29a, 29b of the first and second path 15a, 15b are arranged in the same sub-winding zone 31b. Here, the first end shaped conductor 28a and the first end shaped conductor 28b are arranged in the first sub-winding zone 31a, while the second end shaped conductor 29a and the second end shaped conductor 29b are arranged in the second sub-winding zone 31a.

In the second exemplary embodiment, the paths 15a, 15b extend along the different circumferential directions 27a, 27b. Here, the first path 15a extends along the first circumferential direction 27a and the second path 15b extends along the second circumferential direction 27b. Within a respective path, the first to third sections 16a-c, 17a-c extend along the same circumferential direction 27a, 27b, that is to say here the first to third sections 16a-c of the first path 15a each extend along the first circumferential direction 27a and the first to third sections 17a-c of the second path each extend along the second circumferential direction 27b. Therefore, no reversal of the circumferential direction of the stator winding takes place within a respective path 15a, 15b.

In the second exemplary embodiment, the connectors 32a, which implement an offset by q·N−1=5 slots 3, connect, in the first path 15a, the shaped conductors 4 of the first and second section 16a, 16b and, in the second path 15b, the shaped conductors 4 of the second and third section 17b, 17c. The connectors 32b, which implement an offset by q·N+1=7 slots 3, connect, in the first path 15a, the shaped conductors 4 of the second and third sections 16b, 16c and, in the second path the shaped conductors 4 of the first and second sections 17a, 17b.

In the second exemplary embodiment, the second section 16b of the first path 15a extends only over 2·P=8 winding zones 30.

The groups of the first type 18a, 18b, 119a-d, 20a, 20b, the groups of the second type 121a, 121b, 125 and the groups of the third type 23a-d of the second exemplary embodiment correspond to those of the first exemplary embodiment, as are shown in detail in FIG. 5.

Figure 10:
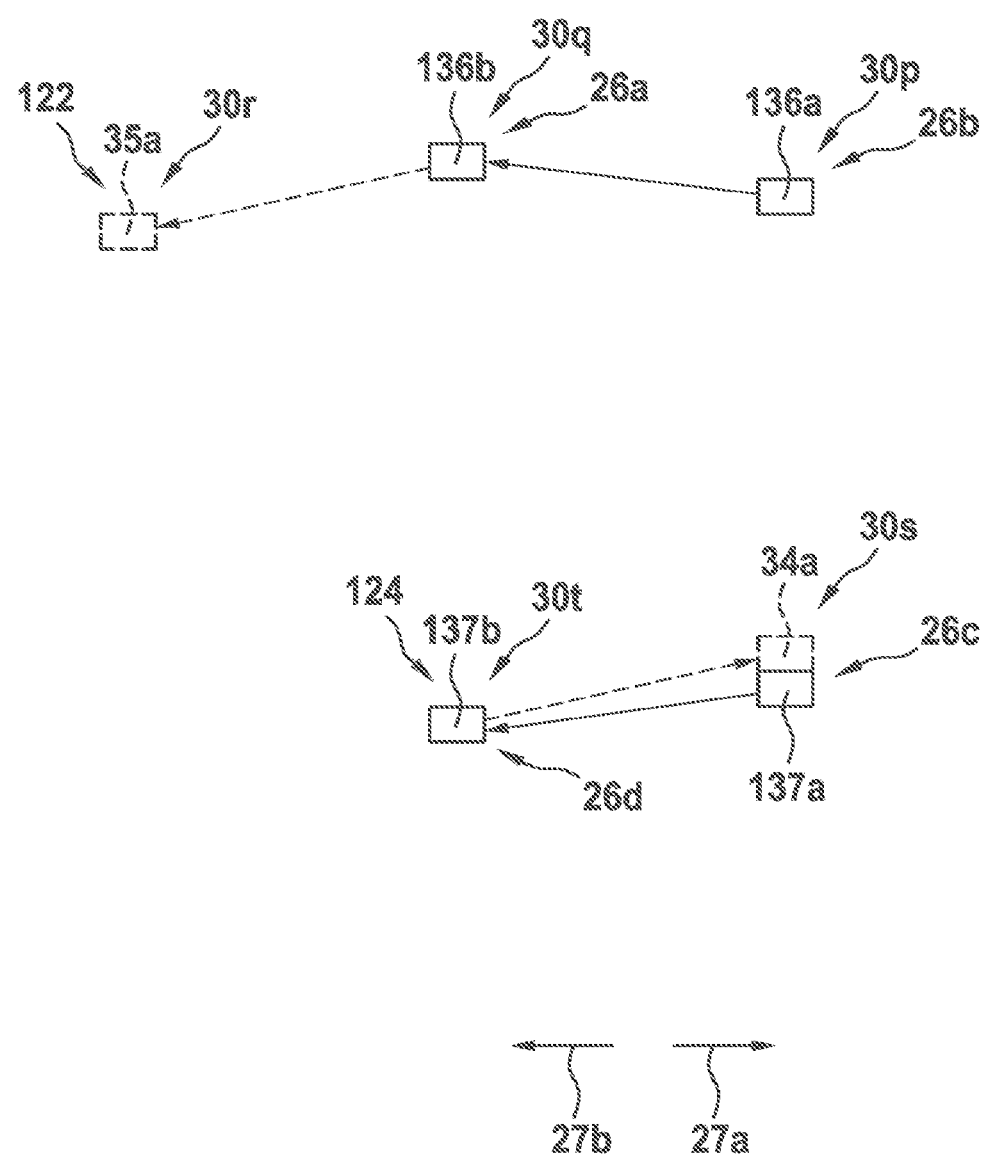
FIG. 10 shows an illustration of a detail of the semigroups of shaped conductors according to the second exemplary embodiment.

FIG. 10 is an illustration of a detail of the semigroups 122, 124 of shaped conductors 4 according to the second exemplary embodiment.

The semigroup of the first type 122 comprises two shaped conductors 4, successive in terms of the series connection, which are separately denoted by 136a, 136b. Furthermore, in FIG. 10, three adjacent winding zones 30 are separately denoted by 30p-r. In the semigroup of the first type 122, a first shaped conductor 136a is arranged in the second layer 26b of one of the winding zones and a second shaped conductor 136b is arranged in the first layer 26a of a winding zone 30q adjacent along the second circumferential direction 27b to the winding zone 30p in which the first shaped conductor 136a is arranged.

The semigroup of the second type 124 comprises two successive shaped conductors 4, in terms of the series connection, which are separately denoted by 137a, 137b. Furthermore, in FIG. 10, two adjacent winding zones 30 are separately denoted by 30s-t. In the semigroup of the second type 124, a first shaped conductor 137a is arranged in the third layer 26c of one of the winding zones 30s and a second shaped conductor 137b is arranged in the fourth layer 126c of a winding zone 30t adjacent along the second circumferential direction 27b to the winding zone 30s in which the first shaped conductor 137a is arranged.

The first shaped conductor 33a (see FIG. 5) of such groups of the first type 18b, 119a-d, 20a, 20b which directly follow a fourth shaped conductor 33d of another of the groups of the first type 18a, 18b, 119a-d, 20a in terms of the series connection is arranged in that winding zone 30c which follows, along the first circumferential direction 27a, the winding zone 30b in which the fourth shaped conductor 33d is arranged.

The first shaped conductor 34a (see FIG. 5) of such groups of the second type 121b which directly follow a fourth shaped conductor 34d of another of the groups of the second type 121a in terms of the series connection is arranged in that winding zone 30f in which the third shaped conductor 34c of the other group of the second type 121a is arranged.

The first shaped conductor 35a (see FIG. 10) of that group of the third type 23a which directly follows the second shaped conductor 136b of the semigroup of the first type 122 in terms of the series connection is arranged in that winding zone 30r which follows, along the second circumferential direction 27b, the winding zone in which the second shaped conductor 136b of the semigroup of the first type 122 is arranged.

The first shaped conductor 137a (see FIG. 5) of the semigroup of the second type 124 is arranged in that winding zone 30j which follows, along the second circumferential direction 27b, the winding zone 30i in which the fourth shaped conductor of the group of the third type 23d is arranged.

The first shaped conductor 34a (see FIG. 10) of that group of the second type 125 which directly follows the second shaped conductor 137b of the semigroup of the second type 124 in terms of the series connection is arranged in that winding zone in which the first shaped conductor 137a of the semigroup of the second type 124 is arranged.

With reference to FIG. 6, in the second exemplary embodiment, the connected second and third shaped conductors 33b, 33c of a respective group of the first type 18a, 18b, 119a-d, 20a, 20b, the connected second and third shaped conductors 35b, 35c of a respective group of the third type 23a-d, the connected fourth and first shaped conductors 34d, 34a of different groups of the second type 121a, 121b, the fourth shaped conductors 34d of the second [(P/2)-th] group of the second type 121b of the first section 17a of the second path 15b and the first shaped conductor 136a, connected thereto, of the semigroup of the first type 122 and the second shaped conductor 137b of the semigroup of the second type 124 and the first shaped conductor 34a, connected thereto, of the group of the first type 125 are formed by conductor segments 38a.

The connected fourth and first shaped conductors 33d, 33a of different groups of the first type 18a, 18b, 119a-d, 20a, 20b of the same section 16a-c and the connected second and third shaped conductors 34b, 34c of a respective group of the second type 121a, 121b, 125 are formed by conductor segments 38b.

In the first path 15a, the outer shaped conductor 4, which faces the second section 16b, of the first section 16a, here the fourth shaped conductor 33d of the second [(P/2)-th)] group of the first type 18b, and the outer shaped conductor 4, which faces the first section 16a, of the second section 16b, here the first shaped conductor 34a of the first group of the first type 119a, are formed by a conductor segment 38c. In the second path 15b, the outer shaped conductor 4, which faces the second section 17b, of the first section 17a, here the second shaped conductor 136b of the semigroup of the first type 122, and the outer shaped conductor 4, which faces the first section 17a, of the second section 17b, here the first shaped conductor 35a of the first group of the third type 23a, are formed by a conductor segment 38d.

In the first path 15a, the outer shaped conductor 4, which faces the third section 16c, of the second section 16b, here the fourth shaped conductor 33d of the fourth (P-th) group of the first type 119d, and the outer shaped conductor 4, which faces the second section 16b, of the third section 16b, here the first shaped conductor 33a of the first group of the first type 20a, are formed by a conductor segment 38d.

In the second path 15*b*, the outer shaped conductor 4, which faces the third section 17*c*, of the second section 17*b*, here the fourth shaped conductor 35*b* of the fourth (P-th) group of the third type 23*d*, and the outer shaped conductor 4, which faces the second section 17*b*, of the third section 17*c*, here the first shaped conductor 137*a* of the semigroup of the second type 124, are formed by a conductor segment 38*c*.

In the second exemplary embodiment, the first end shaped conductor 28*b* of the second path 15*b* is the first shaped conductor 24*s* of the first group of the second type 121*a* and the second end shaped conductor 29*b* is the fourth shaped conductor 24*d* of the [(P/2−1)-th] group of the second type 125.

Figure 11:
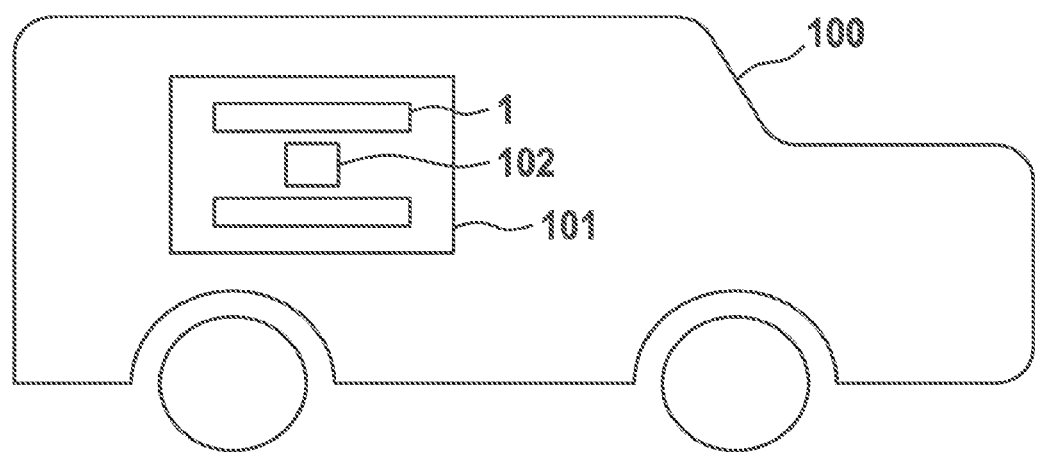
FIG. 11 shows a basic diagram of a vehicle having an exemplary embodiment of an electric machine comprising the stator according to the invention.

FIG. 11 is a basic diagram of a vehicle 100 having an exemplary embodiment of an electric machine 101, for example a synchronous machine or an asynchronous machine/induction machine, which is designed as an electric motor. The electric machine 101 comprises a stator 1 according to one of the previously described exemplary embodiments and a rotor 102 which is rotatably mounted within the stator 1. In the present exemplary embodiment, the rotor 102 is permanently excited, by way of example.

The invention claimed is:

1. Stator for an electric machine, wherein
the stator has a number N≥3 of phases, a number P≥2 of pole pairs and a hole count q=2, wherein
the stator comprises a stator core, which has a first face side, a second face side situated opposite the first face side, and a plurality of slots which extend from the first face side to the second face side and are subdivided into first to L-th layers, where L≥4, and a plurality of shaped conductors which are arranged in the slots in a radially layered manner in the first to L-th layer, wherein the layers are designated in their order in the radial direction, wherein
the shaped conductors form for each phase a first path and a second path, which paths are interconnectable or interconnected with one another in series or in parallel, and are arranged in 2·P winding zones, wherein
each winding zone is subdivided into a first and a second sub-winding zone, each sub-winding zone extends over the L layers and the sub-winding zones of a respective winding zone are designated in their order along a first circumferential direction and a second circumferential direction opposite to the first circumferential direction, wherein
the shaped conductors of a respective path are interconnected by connectors, which connect shaped conductors in adjacent winding zones of the same phase in an alternating manner at the first face side and the second face side of the stator core, to form a series connection with a first end shaped conductor, which is one of the outer shaped conductors, in terms of the series connection, of the path and with a second end shaped conductor, which is the other of the outer shaped conductors, in terms of the series connection, of the path, wherein
the shaped conductors of a respective path form a first section, a second section and a third section of shaped conductors successive in terms of the series connection, wherein
the first section comprises the first end shaped conductor and the third section comprises the second end shaped conductor, wherein
the shaped conductors of the first section and the third section are arranged in one of the sub-winding zones and at least outer shaped conductors, in terms of the series connection, of the second section, in particular all the shaped conductors of the second section, are arranged in the other of the sub-winding zones.

2. Stator according to claim 1, wherein
the first section and the third section of a respective path each extend over a smaller number of successive winding zones of the same phase as the second section of the path.

3. Stator according to claim 1, wherein
the first section of the first path extends over a number P of successive winding zones of the same phase and/or
the second section of the first path extends over a number 2·P or 2·P+2 of successive winding zones of the same phase and/or
the third section of the first path extends over a number P of successive winding zones of the same phase and/or
the first section of the second path extends over a number P+2 of successive winding zones of the same phase and/or
the second section of the second path extends over a number 2·P of successive winding zones of the same phase and/or
the third section of the second path extends over a number P of successive winding zones of the same phase.

4. Stator according to claim 1, wherein
some of the shaped conductors form groups of a first type of four shaped conductors, successive in terms of the series connection, which are designated in their order in terms of the series connection, wherein
a first shaped conductor of a respective one of the groups of the first type is arranged in the first layer of one of the winding zones,
a second shaped conductor of a respective one of the groups of the first type is arranged in the second layer of a winding zone adjacent, along the first circumferential direction, to the winding zone in which the first shaped conductor is arranged,
a third shaped conductor of a respective one of the groups of the first type is arranged in the fourth layer of the winding zone in which the first shaped conductor is arranged, and
a fourth shaped conductor of a respective one of the groups of the first type is arranged in the third layer of the winding zone in which the second shaped conductor is arranged,
wherein
the first shaped conductor of such groups of the first type which directly follow a fourth shaped conductor of another of the groups of the first type in terms of the series connection is arranged in that winding zone which follows, along the first circumferential direction, the winding zone in which the fourth shaped conductor is arranged, wherein
the first section of the first path and/or the third section of the first path are/is each preferably formed from a plurality of groups of the first type connected in series.

5. Stator according to claim 1, wherein
some of the shaped conductors form groups of a second type of four shaped conductors, successive in terms of the series connection, which are designated in their order in terms of the series connection, wherein
a first shaped conductor of a respective one of the groups of the second type is arranged in the second layer of one of the winding zones,
a second shaped conductor of a respective one of the groups of the second type is arranged in the first layer of a winding zone adjacent, along the second circumferential direction, to the winding zone in which the first shaped conductor is arranged,
a third shaped conductor of a respective one of the groups of the second type is arranged in the third layer of a winding zone adjacent, along the second circumferential direction, to the winding zone in which the second shaped conductor is arranged, and
a fourth shaped conductor of a respective one of the groups of the second type is arranged in the fourth layer of a winding zone adjacent, along the second circumferential direction, to the winding zone in which the third shaped conductor is arranged,
wherein
the first shaped conductor of such groups of the second type which directly follow a fourth shaped conductor of another of the groups of the second type in terms of the series connection is arranged in that winding zone in which the third shaped conductor of the other of the groups of the second type is arranged.

6. Stator according to claim 1, wherein
some of the shaped conductors form groups of a third type of four shaped conductors, successive in terms of the series connection, which are designated in their order in terms of the series connection, wherein
a first shaped conductor of a respective one of the groups of the third type is arranged in the third layer of one of the winding zones,
a second shaped conductor of a respective one of the groups of the third type is arranged in the fourth layer of a winding zone adjacent, along the second circumferential direction, to the winding zone in which the first shaped conductor is arranged,
a third shaped conductor of a respective one of the groups of the third type is arranged in the second layer of the winding zone in which the first shaped conductor is arranged, and
a fourth shaped conductor of a respective one of the groups of the third type is arranged in the first layer of the winding zone in which the second shaped conductor is arranged,
wherein
the first shaped conductor of such groups of the third type which directly follow a fourth shaped conductor of another of the groups of the third type in terms of the series connection is arranged in that winding zone which follows, along the second circumferential direction, the winding zone in which the fourth shaped conductor is arranged, wherein the second section of the second path is preferably formed from a plurality of groups of the third type connected in series.

7. Stator according to claim 1, wherein
the first section and the third section of a respective path extend around the stator core along the first circumferential direction and the second section of a respective path extends around the stator core along the second circumferential direction at least in sections.

8. Stator according to claim 7, wherein
the second section of the first path is formed from a plurality of groups of the second type connected in series.

9. Stator according to claim 7, wherein
some of the shaped conductors form a semigroup of the first type, wherein
a first shaped conductor of the semigroup of the first type is arranged in the first layer of one of the winding zones and
a second shaped conductor of the semigroup of the first type is arranged in the second layer of a winding zone adjacent, along the first circumferential direction, to the winding zone in which the first shaped conductor is arranged,
wherein the first section of the second path is formed from a plurality of groups of the first type and a semigroup of the first type which directly follows an outer fourth shaped conductor, in terms of the series connection, of the groups of the first type, and the first shaped conductor of the first semigroup is arranged in a winding zone which follows, along the first circumferential direction, the winding zone in which the outer fourth shaped conductor, in terms of the series connection, of the group of the first type is arranged;
and/or
some of the shaped conductors form a semigroup of the second type, wherein
a first shaped conductor of the semigroup of the second type is arranged in the fourth layer of one of the winding zones and
a second shaped conductor of the semigroup of the second type is arranged in the third layer of a winding zone adjacent, along the first circumferential direction, to the winding zone in which the first shaped conductor is arranged,
wherein the third section of the second path is formed from a semigroup of the second type and at least one group of the first type which directly follows the second shaped conductor of the semigroup of the second type in terms of the series connection, and the first shaped conductor of that group of the first type which directly follows the second shaped conductor of the semigroup of the second type in terms of the series connection is arranged in that winding zone which follows, along the first circumferential direction, the winding zone in which the second shaped conductor of the semigroup of the second type is arranged.

10. Stator according to claim 1, wherein
the first path extends around the stator core along the first circumferential direction and the second path extends around the stator core along the second circumferential direction.

11. Stator according to claim 10, wherein
the second section of the first path is formed from a plurality of groups of the first type connected in series.

12. Stator according to claim 10, wherein
some of the shaped conductors form a semigroup of the first type, wherein
a first shaped conductor of the semigroup of the first type is arranged in the second layer of one of the winding zones and
a second shaped conductor of the semigroup of the first type is arranged in the first layer of a winding zone adjacent, along the second circumferential direction, to the winding zone in which the first shaped conductor is arranged,
wherein the first section of the second path is formed from a plurality of groups of the second type and a semigroup of the first type which directly follows an outer fourth shaped conductor, in terms of the series connection, of the groups of the second type, and the first shaped conductor of the first semigroup is arranged in that winding zone in which the third shaped conductor of the outer of the groups, in terms of the series connection, of the second type is arranged;

and/or
   some of the shaped conductors form a semigroup of the second type, wherein
      a first shaped conductor of the semigroup of the second type is arranged in the third layer of one of the winding zones and
      a second shaped conductor of the semigroup of the second type is arranged in the fourth layer of a winding zone adjacent, along the second circumferential direction, to the winding zone in which the first shaped conductor is arranged,
   wherein the third section of the second path is formed from a semigroup of the second type and at least one group of the second type which directly follows the second shaped conductor of the semigroup of the second type in terms of the series connection, and the first shaped conductor of that group of the second type which directly follows the second shaped conductor of the semigroup of the second type in terms of the series connection is arranged in that winding zone in which the first shaped conductor of the semigroup of the second type is arranged.

13. Stator according to claim 1, wherein
the first end shaped conductors of the first and the second path
   are arranged in different sub-winding zones and the second end shaped conductors of the first and the second path are arranged in different sub-winding zones or
   are arranged in the same sub-winding zone and the second end shaped conductors of the first and the second path are arranged in the same sub-winding zone.

14. Stator according to claim 1, further comprising
a connection device with phase connections and at least one star point, which connection device
   connects the paths of a respective phase in parallel in such a way that the first end shaped conductors are connected to the phase connections and the second end shaped conductors are connected to form a star point or to form two star points or in that the second end shaped conductors are connected to the phase connections and the first end shaped conductors are connected to form a star point or two star points, or
   the paths of a respective phase are connected in series in such a way that one of the end shaped conductors of one of the paths is connected to the phase connections and one of the end shaped conductors of the other of the paths is connected to the star point.

15. Electric machine for driving a vehicle, comprising a stator according to claim 1 and a rotor rotatably mounted within the stator.

16. Stator according to claim 2, wherein
the first section of the first path extends over a number P of successive winding zones of the same phase and/or
the second section of the first path extends over a number 2·P or 2·P+2 of successive winding zones of the same phase and/or
the third section of the first path extends over a number P of successive winding zones of the same phase and/or
the first section of the second path extends over a number P+2 of successive winding zones of the same phase and/or
the second section of the second path extends over a number 2·P of successive winding zones of the same phase and/or
the third section of the second path extends over a number P of successive winding zones of the same phase.

17. Stator according to claim 2, wherein
some of the shaped conductors form groups of a first type of four shaped conductors, successive in terms of the series connection, which are designated in their order in terms of the series connection, wherein
   a first shaped conductor of a respective one of the groups of the first type is arranged in the first layer of one of the winding zones,
   a second shaped conductor of a respective one of the groups of the first type is arranged in the second layer of a winding zone adjacent, along the first circumferential direction, to the winding zone in which the first shaped conductor is arranged,
   a third shaped conductor of a respective one of the groups of the first type is arranged in the fourth layer of the winding zone in which the first shaped conductor is arranged, and
   a fourth shaped conductor of a respective one of the groups of the first type is arranged in the third layer of the winding zone in which the second shaped conductor is arranged,
wherein
the first shaped conductor of such groups of the first type which directly follow a fourth shaped conductor of another of the groups of the first type in terms of the series connection is arranged in that winding zone which follows, along the first circumferential direction, the winding zone in which the fourth shaped conductor is arranged, wherein
the first section of the first path and/or the third section of the first path are/is each preferably formed from a plurality of groups of the first type connected in series.

18. Stator according to claim 2, wherein
some of the shaped conductors form groups of a second type of four shaped conductors, successive in terms of the series connection, which are designated in their order in terms of the series connection, wherein
   a first shaped conductor of a respective one of the groups of the second type is arranged in the second layer of one of the winding zones,
   a second shaped conductor of a respective one of the groups of the second type is arranged in the first layer of a winding zone adjacent, along the second circumferential direction, to the winding zone in which the first shaped conductor is arranged,
   a third shaped conductor of a respective one of the groups of the second type is arranged in the third layer of a winding zone adjacent, along the second circumferential direction, to the winding zone in which the second shaped conductor is arranged, and
   a fourth shaped conductor of a respective one of the groups of the second type is arranged in the fourth layer of a winding zone adjacent, along the second circumferential direction, to the winding zone in which the third shaped conductor is arranged,
wherein
the first shaped conductor of such groups of the second type which directly follow a fourth shaped conductor of another of the groups of the second type in terms of the series connection is arranged in that winding zone in which the third shaped conductor of the other of the groups of the second type is arranged.

19. Stator according to claim 2, wherein
some of the shaped conductors form groups of a third type of four shaped conductors, successive in terms of the series connection, which are designated in their order in terms of the series connection, wherein
- a first shaped conductor of a respective one of the groups of the third type is arranged in the third layer of one of the winding zones,
- a second shaped conductor of a respective one of the groups of the third type is arranged in the fourth layer of a winding zone adjacent, along the second circumferential direction, to the winding zone in which the first shaped conductor is arranged,
- a third shaped conductor of a respective one of the groups of the third type is arranged in the second layer of the winding zone in which the first shaped conductor is arranged, and
- a fourth shaped conductor of a respective one of the groups of the third type is arranged in the first layer of the winding zone in which the second shaped conductor is arranged, wherein
the first shaped conductor of such groups of the third type which directly follow a fourth shaped conductor of another of the groups of the third type in terms of the series connection is arranged in that winding zone which follows, along the second circumferential direction, the winding zone in which the fourth shaped conductor is arranged, wherein the second section of the second path is preferably formed from a plurality of groups of the third type connected in series.

20. Stator according to claim 2, wherein
the first section and the third section of a respective path extend around the stator core along the first circumferential direction and the second section of a respective path extends around the stator core along the second circumferential direction at least in sections.

* * * * *